(12) United States Patent
Yasui et al.

(10) Patent No.: US 7,103,466 B2
(45) Date of Patent: Sep. 5, 2006

(54) METHOD AND AN APPARATUS FOR PREDICTING INTAKE MANIFOLD PRESSURE OF AN INTERNAL-COMBUSTION ENGINE

(75) Inventors: Yuji Yasui, Saitama (JP); Akihiro Shinjo, Saitama (JP); Michihiko Matsumoto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 176 days.

(21) Appl. No.: 10/695,486

(22) Filed: Oct. 29, 2003

(65) Prior Publication Data

US 2004/0162665 A1    Aug. 19, 2004

(30) Foreign Application Priority Data

Oct. 30, 2002    (JP) .............................. 2002-315473

(51) Int. Cl.
*G06F 7/00*    (2006.01)
*F02D 41/14*    (2006.01)

(52) U.S. Cl. .................. 701/106; 701/98; 123/376; 60/290

(58) Field of Classification Search .................. 701/27, 701/40, 44, 57, 77, 98, 106; 123/376, 382, 123/462, 463; 700/50; 706/3–5, 19, 25–27, 706/31, 902; 60/290
See application file for complete search history.

(56) References Cited

U.S. PATENT DOCUMENTS 6,092,017 A * 7/2000 Ishida et al. ................. 701/106

6,405,122 B1 * 6/2002 Yamaguchi .................. 701/106

FOREIGN PATENT DOCUMENTS

| JP | 2-42160 | 2/1990 |
| JP | 2886771 | 2/1999 |

\* cited by examiner

*Primary Examiner*—Willis R. Wolfe
*Assistant Examiner*—Johnny H. Hoang
(74) *Attorney, Agent, or Firm*—Squire, Sanders & Dempsey, LLP.

(57) ABSTRACT

A method and an apparatus for predicting intake manifold pressure are presented, to compensate for a large lag or a large time delay without producing an overshoot or discontinuous behaviors of a predicted value. The method comprises the step of obtaining a difference of values of a variable to be predicted and a difference of values of another variable ahead of the variable to be predicted. The method further comprises the step of filtering the differences with adaptive filters. The method further comprises the step of obtaining a predicted difference of values of the variable to be predicted, through algorithm of estimation with fuzzy reasoning. The method further comprises the step of adding the predicted difference of values of the variable to be predicted, to a current value of the variable to be predicted, to obtain a predicted value of the variable to be predicted.

36 Claims, 35 Drawing Sheets

FIG. 4
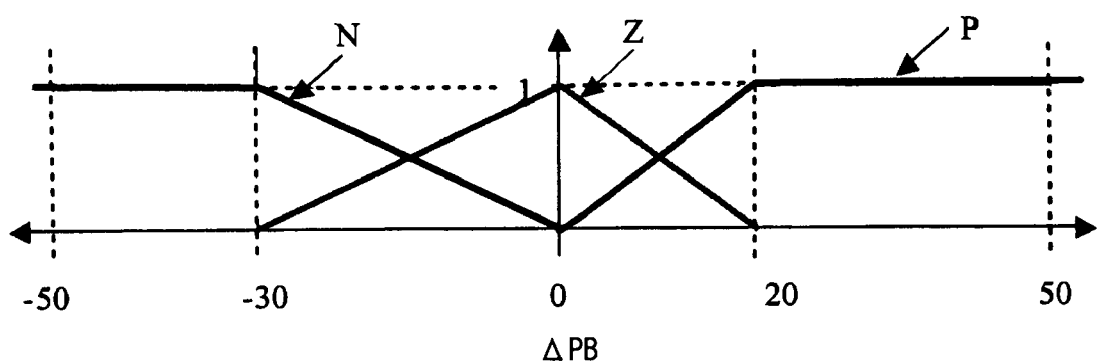
(a) ANTECEDENT PART FOR ΔPB
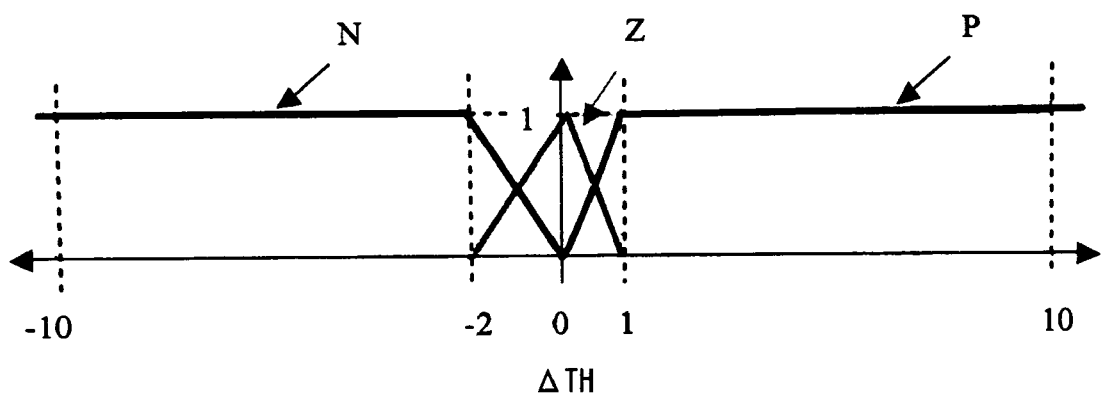
(b) ANTECEDENT PART FOR ΔTH

FIG. 6

| | ΔPB | | |
|---|---|---|---|
| | N | Z | P |
| ΔTH  N | N<br>RULE 1 | N<br>RULE 4 | Z<br>RULE 7 |
| Z | N<br>RULE 2 | Z<br>RULE 5 | $P_8$<br>RULE 8 |
| P | Z<br>RULE 3 | $P_6$<br>RULE 6 | $P_9$<br>RULE 9 |

RULE 8

FIG. 16
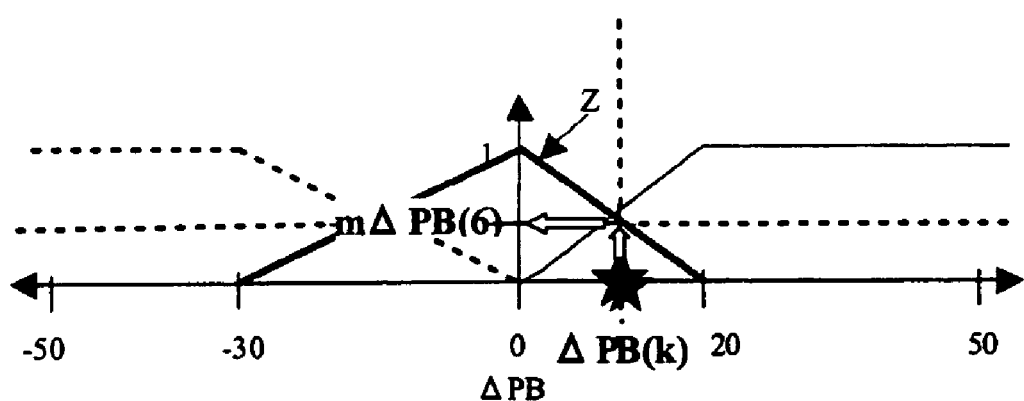
(a) ANTECEDENT PART FOR ΔPB
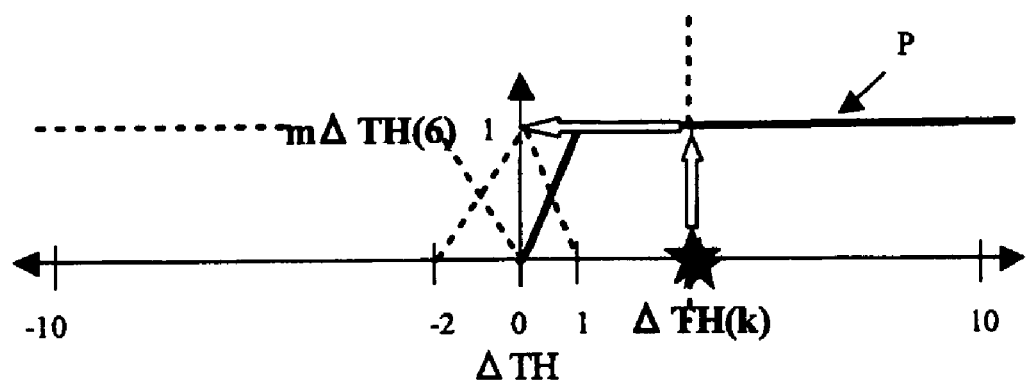
(b) ANTECEDENT PART FOR ΔTH

FIG. 19
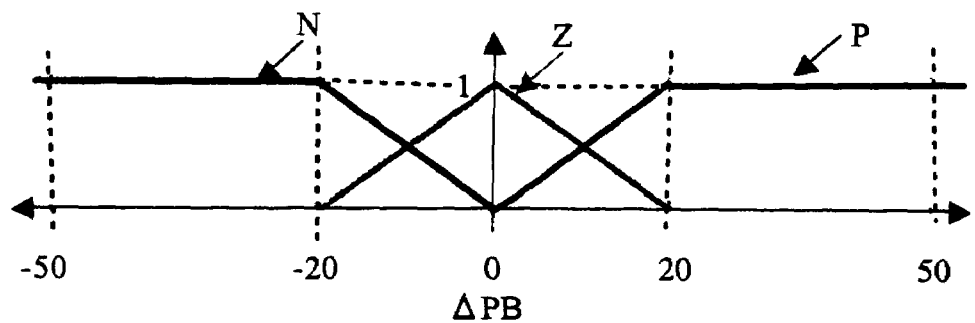
(a) ANTECEDENT PART FOR ΔPB
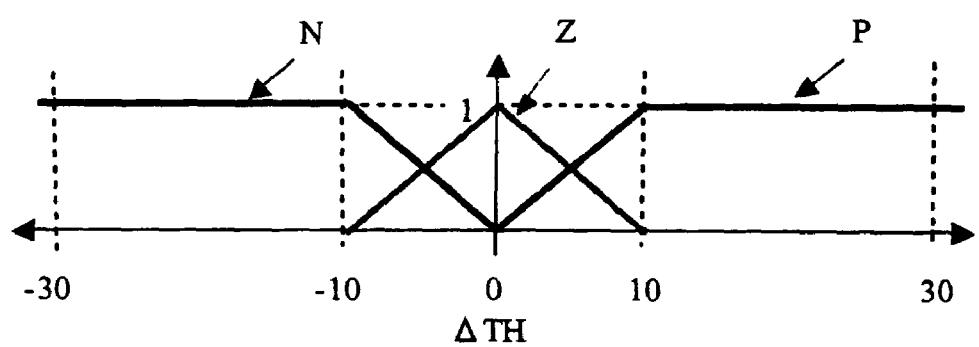
(b) ANTECEDENT PART FOR ΔTH
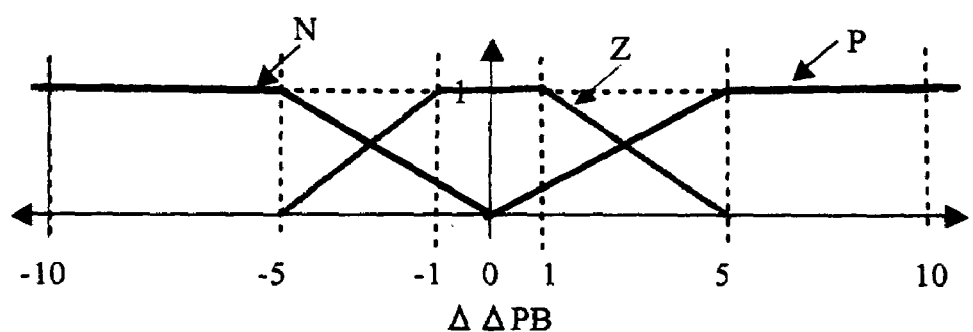
(c) ANTECEDENT PART FOR ΔΔPB

| | ΔPB | | |
|---|---|---|---|
| | N | Z | P |
| ΔTH N | N<br>RULE 1 | N<br>RULE 4 | Z<br>RULE 7 |
| ΔTH Z | N<br>RULE 2 | Z<br>RULE 5 | P$_8$<br>RULE 8 |
| ΔTH P | Z<br>RULE 3 | P$_6$<br>RULE 6 | *P$_{10}$*<br>*RULE 10* |

ΔΔPB=Z :

| | ΔPB | | |
|---|---|---|---|
| | N | Z | P |
| ΔTH N | N<br>RULE 1 | N<br>RULE 4 | Z<br>RULE 7 |
| ΔTH Z | N<br>RULE 2 | Z<br>RULE 5 | P$_8$<br>RULE 8 |
| ΔTH P | Z<br>RULE 3 | P$_6$<br>RULE 6 | P$_9$<br>RULE 9 |

ΔΔPB=N :

| | ΔPB | | |
|---|---|---|---|
| | N | Z | P |
| ΔTH N | N<br>RULE 1 | N<br>RULE 4 | Z<br>RULE 7 |
| ΔTH Z | N<br>RULE 2 | Z<br>RULE 5 | *Z*<br>*RULE 11* |
| ΔTH P | Z<br>RULE 3 | P$_6$<br>RULE 6 | P$_9$<br>RULE 9 |

METHOD AND AN APPARATUS FOR PREDICTING INTAKE MANIFOLD PRESSURE OF AN INTERNAL-COMBUSTION ENGINE

BACKGROUND OF THE INVENTION

1. Field of the Invention

The present invention relates to a method and an apparatus for predicting an intake manifold pressure of an internal-combustion engine. In particular, the present invention relates to a method and a fuzzy estimator for predicting an intake manifold pressure, using fuzzy algorithm.

2. Description of the Related Art

Fuel injection control is carried out for efficient combustion in internal-combustion engines. FIG. 1 shows an intake portion of an internal-combustion engine, to which the present invention is applied. A drawn air is supplied to a cylinder through a throttle 1. Throttle opening is controlled at a desired value. An intake manifold pressure is measured with a sensor 2. For appropriate fuel injection control, an amount of air to be drawn into the cylinder must be estimated and therefore a value of intake manifold pressure must be predicted.

Conventionally, such an intake manifold pressure predicting apparatus as described below was disclosed, for example in Publication of Japanese Unexamined Patent Publication (KOKAI) No. 2-42160. The apparatus predicts an intake manifold pressure at the present time based on operating states of the internal-combustion engine and predicts intake manifold pressure at a time of prediction, a certain period ahead, based on the predicted intake manifold pressure and a detected value of intake manifold pressure.

However, the above-mentioned predicting apparatus was not able to make a prediction with sufficient accuracy over a wide range of number of revolutions of the internal-combustion engine. The reason is that the apparatus corrects a predicted intake manifold pressure during a period while an intake valve is transiently closed, evenly based on an error in intake manifold pressure ΔP and independently of operating states of the internal-combustion engine.

Japanese Patent No. 2886771 discloses an intake manifold pressure predicting apparatus which makes a prediction considering operating states of the internal-combustion engine to solve the above-mentioned problem, and enables a high accuracy control even in the case of lower number of revolutions and higher intake manifold pressures.

In the conventional method mentioned above, a predicted value of intake manifold pressure (hereinafter referred to as HATPB) is calculated based on a difference (hereinafter referred to as ΔPB) between successive values of intake manifold pressure (hereinafter referred to as PB) and a difference (hereinafter referred to as ΔTH) between successive values of throttle opening. Further, HATPB is used for fuel injection control and retrieval of parameters for fuel adhesion correction. Now, ΔTH and ΔPB are represented as below provided that k is a point in control time synchronized with intake stroke (TDC).

$$\Delta TH(k) = TH(k) + TH(k-1) \quad (1)$$

$$\Delta PB(k) = PB(k) + PB(k-1) \quad (2)$$

On the other hand, between the detecting portion of a PB sensor and an intake manifold, on the intake manifold side or in the PB sensor, a labyrinth mechanism or the like has recently been provided to prevent water from entering there. Accordingly, a time lag and a time delay between an actual value of pressure and an output of the PB sensor, have become larger.

There have been attempts to use conventional prediction algorithms to compensate the time delay. However, the algorithms have caused an overshoot of HATPB against an actual PB, as shown in FIG. 2 or a discontinuous behavior of HATPB. The reason for the overshoot is that the conventional prediction algorithms make up for insufficient accuracy of a predicted value of PB through feedback of an error between a predicted value of PB a certain time in advance and the current value of PB. Further, the reason for the discontinuous behavior is that the conventional prediction algorithms use one of predicted values calculated respectively based on ΔPB and ΔTH, by switching according to certain conditions. Such behaviors of the conventional prediction algorithms have such an influence on fuel injection control as to cause a problem that variation in variables during transient operations becomes larger to increase an amount of emissions of offensive exhaust elements.

Accordingly, there has been a need for a new prediction algorithm for PB to compensate for a larger lag and a larger time delay without producing an overshoot or a discontinuous behavior of HATPB.

SUMMARY OF THE INVENTION

A method for predicting intake manifold pressure according to an aspect of the present invention, comprises the step of obtaining a difference of values of intake manifold pressure and a difference of values of throttle opening. The method further comprises the step of obtaining a predicted difference of values of intake manifold pressure, through algorithm of estimation with fuzzy reasoning. The method further comprises the step of adding the predicted difference of values of intake manifold pressure, to a value of intake manifold pressure, to obtain a predicted value of intake manifold pressure. The algorithm of estimation with fuzzy reasoning, includes fuzzy rules determined based on an amount of a difference of values of intake manifold pressure and an amount of a difference of values of throttle opening.

An apparatus for predicting intake manifold pressure, according to another aspect of the present invention, comprises a device for obtaining a difference of values of intake manifold pressure, a device for obtaining a difference of values of throttle opening and a fuzzy estimator. The fuzzy estimator receives as inputs the difference of values of intake manifold pressure and the difference of values of throttle opening and obtains and outputs a predicted difference of values of intake manifold pressure, through algorithm of estimation with fuzzy reasoning. The algorithm of estimation with fuzzy reasoning includes fuzzy rules determined based on an amount of a difference of values of intake manifold pressure and an amount of a difference of values of throttle opening.

A computer-readable medium, according to another aspect of the present invention, has a program stored therein, which is made to perform the step of obtaining a difference of values of intake manifold pressure and a difference of values of throttle opening. The program is further made to perform the step of obtaining a predicted difference of values of intake manifold pressure, through algorithm of estimation with fuzzy reasoning. The program is further made to perform the step of adding the predicted difference of values of intake manifold pressure, to a value of intake manifold pressure, to obtain a predicted value of intake manifold pressure. The algorithm of estimation with fuzzy reasoning, includes fuzzy rules determined based on an amount of a difference of values of intake manifold pressure and an amount of a difference of values of throttle opening.

Thus, in the aspects of the present invention mentioned above, a predicted value of an output of the PB sensor is calculated through algorithm of estimation with fuzzy reasoning, based an on output of the PB sensor and TH opening. Then, an amount of fuel injection into the internal combustion engine is determined based on the predicted value. In particular, use of fuzzy rules based on an amount of $\Delta PB$ and that of $\Delta TH$ allows a control effectively containing information on a change in TH which is ahead of a change in PB. According to the aspects of the present invention mentioned above, even when there occurs a large time delay or a large lag between an actual value of intake manifold pressure (negative) and an output of the PB sensor, predicted values will not be discontinuous as in conventional methods and predicted values which are continuous can be calculated with higher accuracy. Accordingly, an air-fuel ratio of the internal combustion engine will not show a discontinuous behavior. Further, an overshoot of the predicted value against the actual value of intake manifold pressure, can be dramatically reduced compared with conventional methods.

According to an embodiment of the present invention, a difference of values of intake manifold pressure is classified based on its amount into positive one, that of zero or negative one and a difference of values of throttle opening is classified based on its amount into positive one, that of zero or negative one. Further, fuzzy rules are provided respectively for areas determined by the two kinds of classifications.

Accordingly, operations for estimation through fuzzy reasoning will not become complicated and can be carried out simply and efficiently.

According to another embodiment of the present invention, a second order difference of values of intake manifold pressure, is further obtained. Then, fuzzy rules are determined based on an amount of a difference of values of intake manifold pressure, an amount of a difference of values of throttle opening and an amount of a second order difference of values of intake manifold pressure.

Accordingly, a control effectively using information on behaviors of $\Delta PB$ in the future, contained in $\Delta\Delta PB$ (a second order difference of values of intake manifold pressure), can be carried out.

According to another embodiment of the present invention, a second order difference of values of intake manifold pressure is classified based on its amount into positive one, that of zero or negative one. Then, fuzzy rules are provided respectively for areas determined by three kinds of classifications based on an amount of a difference of values of intake manifold pressure, an amount of a difference of values of throttle opening and an amount of a second order difference of values of intake manifold pressure.

Accordingly, operations for estimation through fuzzy reasoning will not become complicated and can be carried out simply and efficiently.

According to another embodiment of the present invention, a value obtained by delaying a throttle opening value by a time delay, is used as a throttle opening value.

Accordingly, even if a volume of the intake manifold is so large that there occurs a time delay between a change in throttle opening and a change in actual PB, information on TH can be used for prediction and predicted values which do not shown discontinuous behaviors, can be calculated with higher accuracy.

According to another embodiment of the present invention, a relationship between a throttle opening value and a desired value of throttle opening is modeled using a time delay element and a lag system and a value estimated through the model and the desired value is used as a throttle opening value. That is, provided that an estimated value of throttle opening and a desired value of throttle opening at point k in time, are respectively represented as THHAT(k) and THCMD(k), a value corresponding to a time delay is represented as ddly and a constant is represented as Kdly, an estimated value of throttle opening THHAT(k) is obtained by the following equation for use.

$$THHAT(k)=Kdly \times THHAT(k)+(1-Kdly) \times THCMD(k-ddly)$$

Accordingly, even when an electronically controlled throttle involving a time delay before reading of TH, is used, a predicted value can be calculated with high accuracy.

According to another embodiment of the present invention, the membership function for the consequent part of the algorithm of estimation with fuzzy reasoning, is a bar-shaped singleton function.

Accordingly, operations for estimation through fuzzy reasoning will not become complicated and can be carried out simply and efficiently. A processor proof against such service conditions for vehicles as cryogenic temperatures, high temperatures, high humidity and vibration, can hardly be provided with such high computing ability as is able to carry out mini-max gravity method of the algorithm of estimation with fuzzy reasoning. However, use of a bar-shaped singleton function as the membership function for the consequent part, enables the processor to carry out mini-max gravity method and to calculate a predicted value with high accuracy.

According to another embodiment of the present invention, inputs are subjected to filtering.

Accordingly, use of filtered data as input data to the algorithm of estimation with fuzzy reasoning, prevents a predicted value from oscillating even when noises are mixed.

According to another embodiment of the present invention, the filtering is carried out with an adaptive filter.

Accordingly, noises can be eliminated from the data to a sufficient degree while maintaining a phase delay of the data minimum so that the data can be used for predicting operations.

A method for obtaining a predicted value of a variable, according to an aspect of the present invention, comprises the step of obtaining a difference of values of a variable to be predicted and a difference of values of another variable ahead of the variable to be predicted. The method further comprises the step of filtering the differences with adaptive filters. The method further comprises the step of obtaining a predicted difference of values of the variable to be predicted, through algorithm of estimation with fuzzy reasoning. The method further comprises the step of adding the predicted difference of values of the variable to be predicted, to a current value of the variable to be predicted, to obtain a predicted value of the variable to be predicted. The algorithm of estimation with fuzzy reasoning includes fuzzy rules determined based on an amount of a difference of values of the variable to be predicted and an amount of a difference of values of the variable ahead of the variable to be predicted.

A predicting apparatus, according to an aspect of the present invention, comprises filters for filtering inputs and a fuzzy estimator. The fuzzy estimator receives as inputs a difference of values of a variable to be predicted and a difference of values of another variable ahead of the variable to be predicted and obtains and outputs a predicted difference of values of the variable to be predicted, through algorithm of estimation with fuzzy reasoning. The algorithm of estimation with fuzzy reasoning includes fuzzy rules determined based on an amount of a difference of values of the variable to be predicted and an amount of a difference of values of the variable ahead of the variable to be predicted.

A computer-readable medium, according to an aspect of the present invention, has a program stored therein, which is made to perform the step of obtaining a difference of values of the variable to be predicted and a difference of values of another variable ahead of the variable to be predicted. The program is further made to perform the step of filtering the differences with adaptive filters. The program is further made to perform the step of obtaining a predicted difference of values of the variable to be predicted, through algorithm of estimation with fuzzy reasoning. The program is further made to perform the step of adding the predicted difference of values of the variable to be predicted, to a current value of the variable to be predicted, to obtain a predicted value of the variable to be predicted. The algorithm includes fuzzy rules determined based on an amount of a difference of values of the variable to be predicted and an amount of a difference of values of the variable ahead of the variable to be predicted.

Thus, according to the aspects mentioned above, use of fuzzy rules based on an amount of a difference of the variable to be predicted and that of the variable ahead of the variable to be predicted, allows a control effectively containing information on a change in the variable ahead of the variable to be predicted. Further, use of adaptive filters allows noises to be eliminated from the data to a sufficient degree while maintaining a phase delay of the data minimum so that the data can be used for predicting operations.

BRIEF DESCRIPTION OF THE DRAWINGS

FIG. 4 shows membership functions for the antecedent part according to an embodiment of the present invention.

FIG. 6 shows fuzzy rules used in an embodiment of the present invention.

FIG. 16 shows a method by which the degree of fulfillment for Rule 6 is obtained based on the membership functions for the antecedent part.

FIG. 19 shows the membership functions of the antecedent part according to another embodiment of the present invention.

FIG. 20 shows fuzzy rules according to another embodiment of the present invention.

DETAILED DESCRIPTION OF THE PREFFERRED EMBODIMENTS

In the present invention, a predicted amount of change in PB (hereinafter referred to as ΔFZPB) is obtained through estimation with fuzzy reasoning, using fuzzy algorithm including fuzzy rules defined based on an amount of ΔPB and that of ΔTH. Then, a predicted value (hereinafter referred to as FZPB) through estimation with fuzzy reasoning is calculated by the following equation.

$$FZPB(k)=PB(k)+\Delta FZPB(k) \qquad (3)$$

Figure 3:
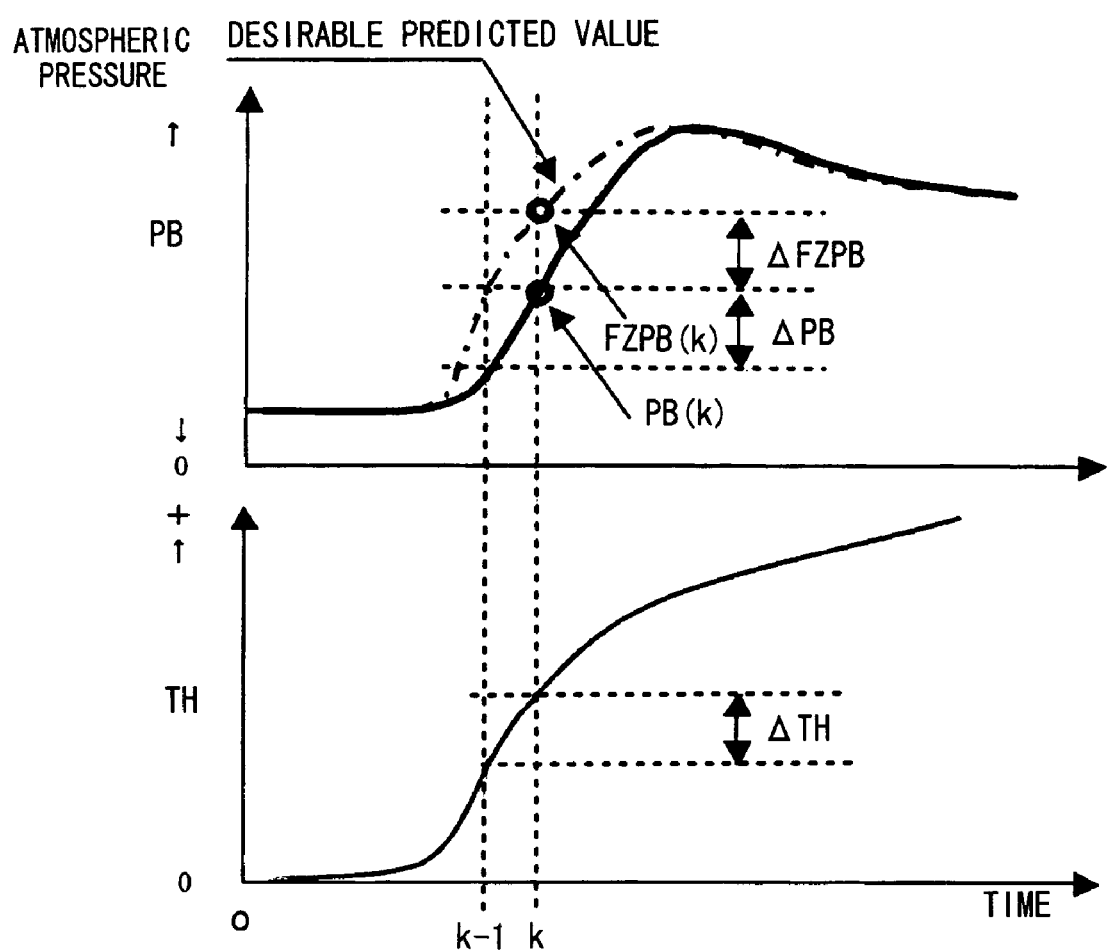
FIG. 3 shows relationships among PB, TH, ΔPB, ΔTH and ΔFZPB.

That is, ΔFZPB(k) is added to the current PB sample value PB(k) to obtain FZPB(k). "k" indicates a point in control time synchronized with intake stroke (TDC). FIG. 3 shows relationships among PB, TH, ΔPB, ΔTH and ΔFZPB.

FIG. 6 shows fuzzy rules used in an embodiment of the present invention. ΔPB is classified based on its amount into positive one, that of zero or negative one. ΔTH is classified based on its amount into positive one, that of zero or negative one. Fuzzy rules are provided respectively for 9 areas determined by the two kinds of classifications. It should be noted here that a change in TH is ahead of a change in PB and therefore contains information on behaviors of PB in the future. Accordingly, use of fuzzy rules based on an amount of ΔPB and that of ΔTH allows a control effectively containing information on a change in TH which is ahead of a change in PB.

Figure 5:
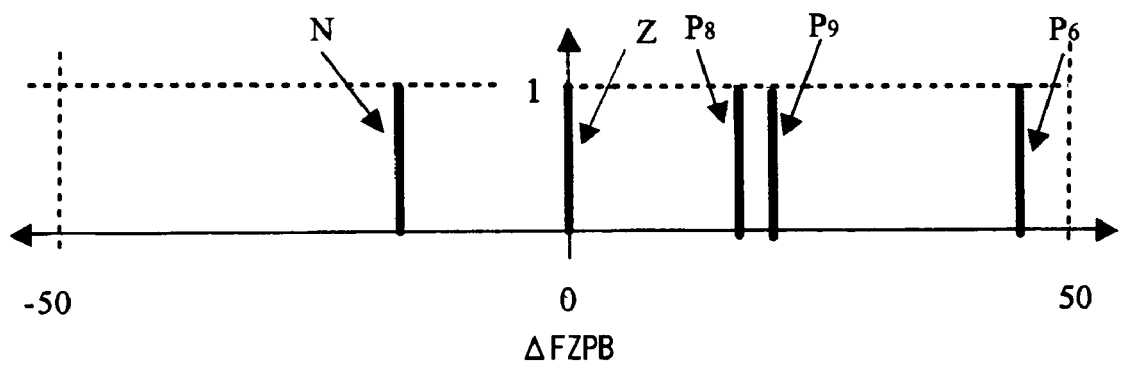
FIG. 5 shows membership function for the consequent part according to an embodiment of the present invention.

FIGS. 4 and 5 respectively show membership functions for the antecedent part and that for the consequent part. The membership functions for the antecedent part for ΔPB and ΔTH are set trapezoidal for positive (P) and negative (N) and set triangular for zero (Z). As the membership function for the consequent part, a bar-shape singleton function is used for simple operations of estimation with fuzzy reasoning.

Now each rule (Rule 1 to Rule 9 in FIG. 6) in each area will be described with reference to drawings.

Figure 7:
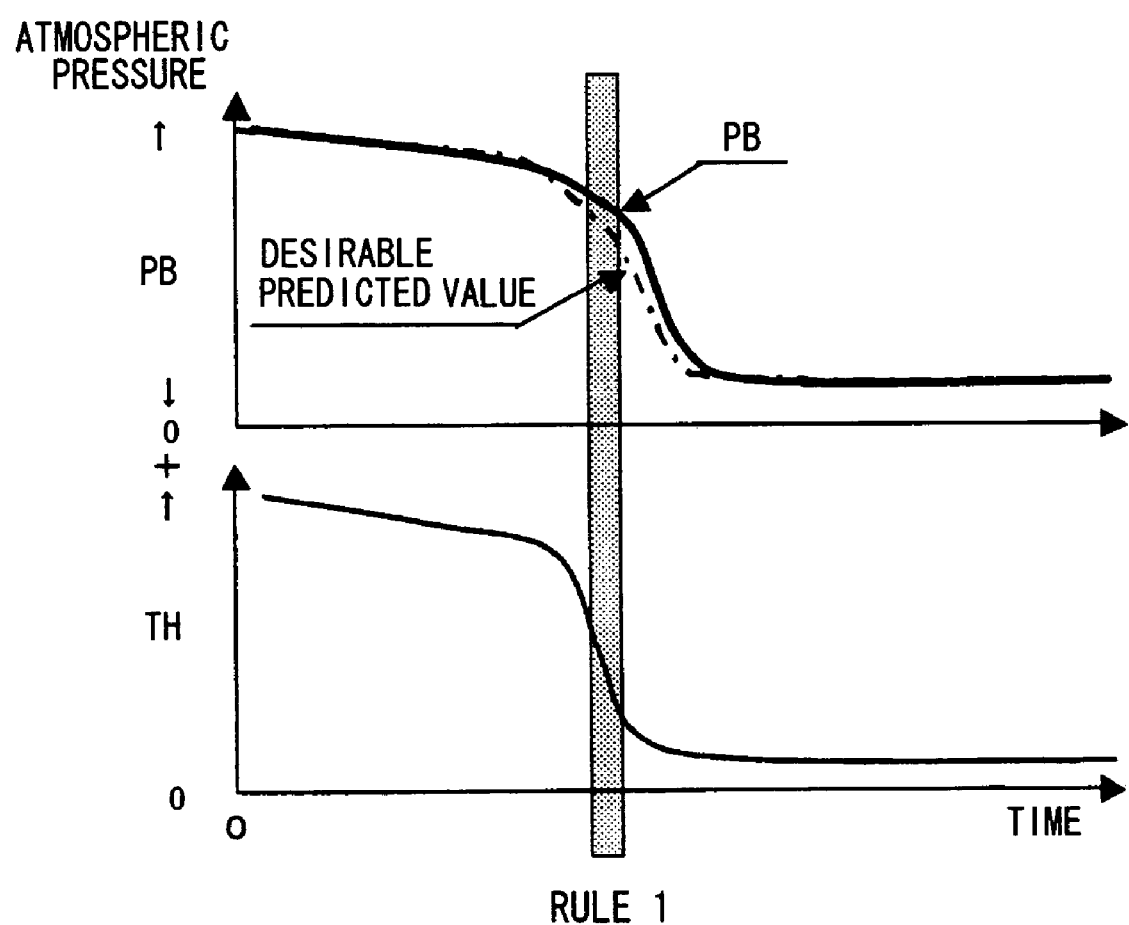
FIG. 7 shows a state to which Rule 1 is applied.

FIG. 7 shows a state in which both ΔPB and ΔTH are negative. Rule 1 is applied to the state. Since both ΔPB and ΔTH are negative, ΔFZPB of the membership function for the consequent part is also set negative.

Figure 8:
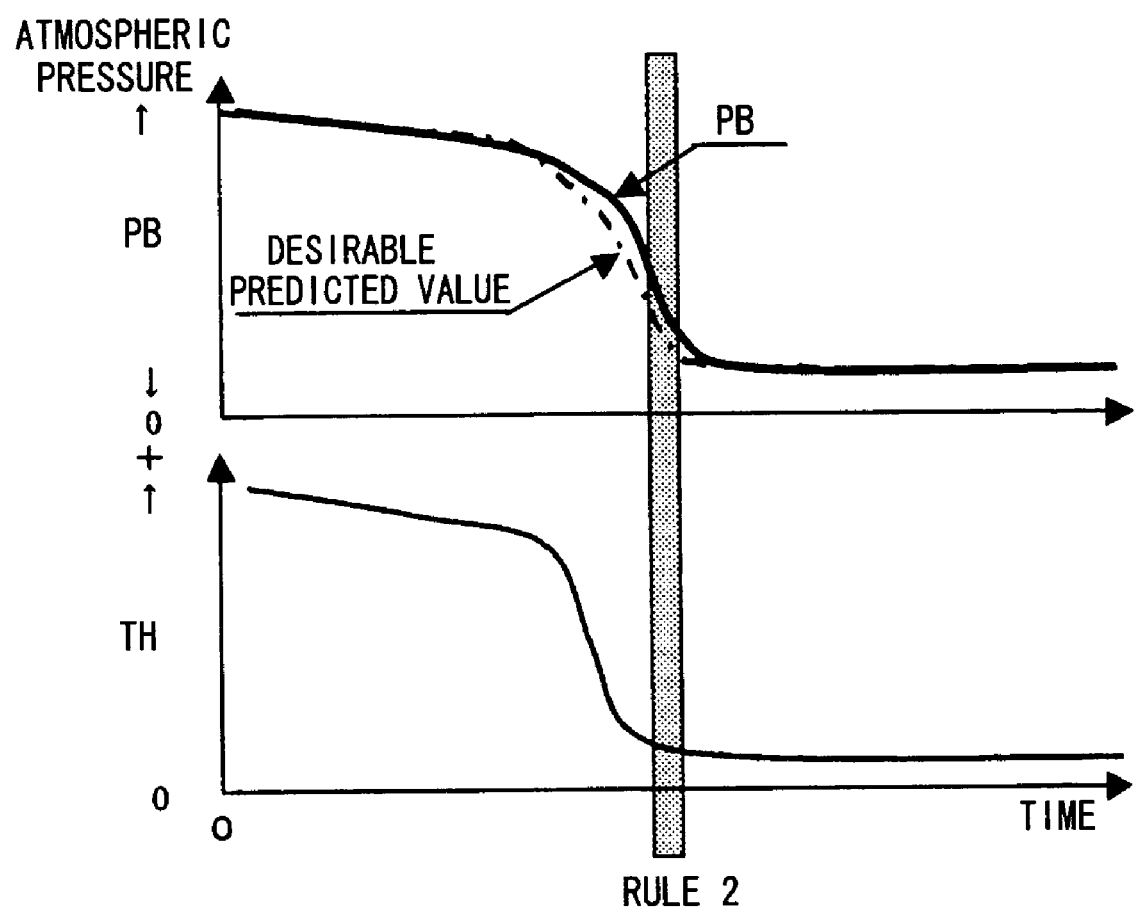
FIG. 8 shows a state to which Rule 2 is applied.

FIG. 8 shows a state in which ΔPB is negative and ΔTH is zero. Rule 2 is applied to the state. Since ΔPB is negative while ΔTH which is ahead of ΔPB is zero, ΔFZPB of the membership function for the consequent part is set negative.

Figure 9:
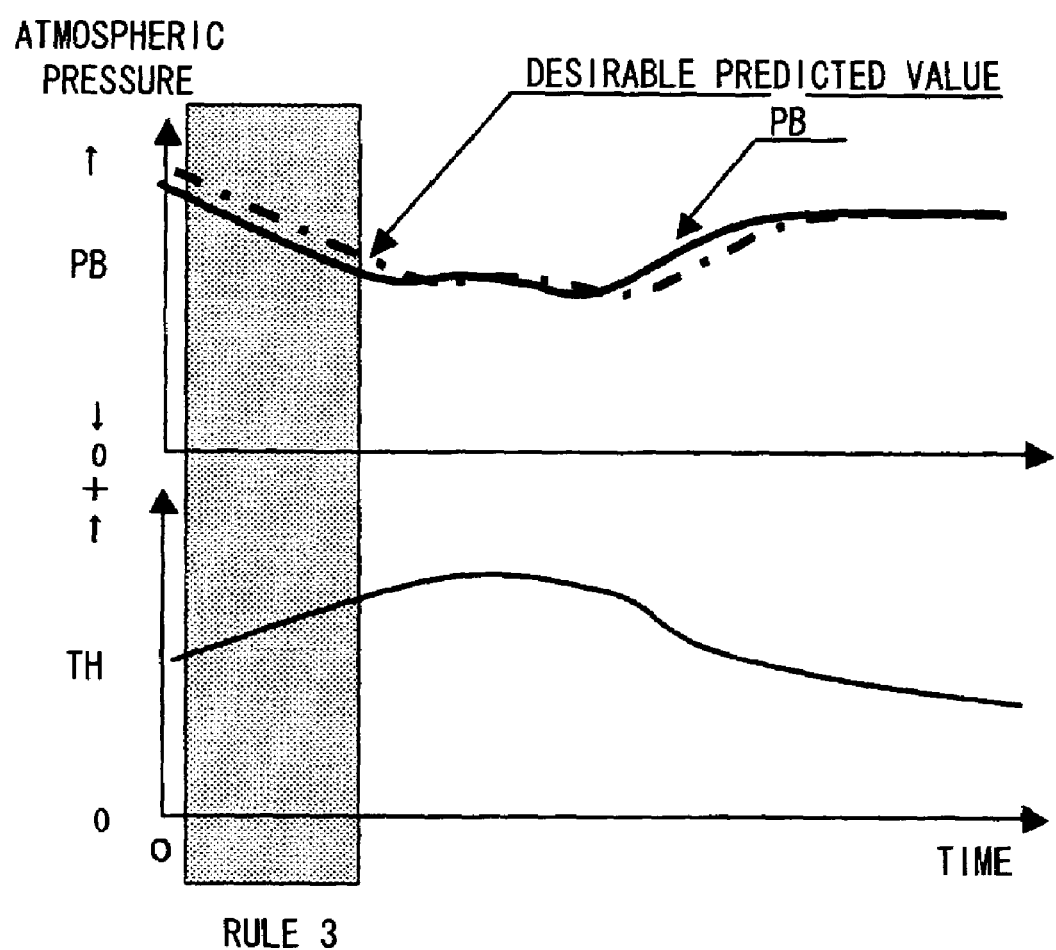
FIG. 9 shows a state to which Rule 3 is applied.

FIG. 9 shows a state in which ΔPB is negative and ΔTH is positive. Rule 3 is applied to the state. The state corresponds to the case in which during operation of engine brake number of revolutions of the engine increases more rapidly than an amount of air passing through the throttle increases due to increase in TH. ΔFZPB of the membership function for the consequent part is set zero.

Figure 10:
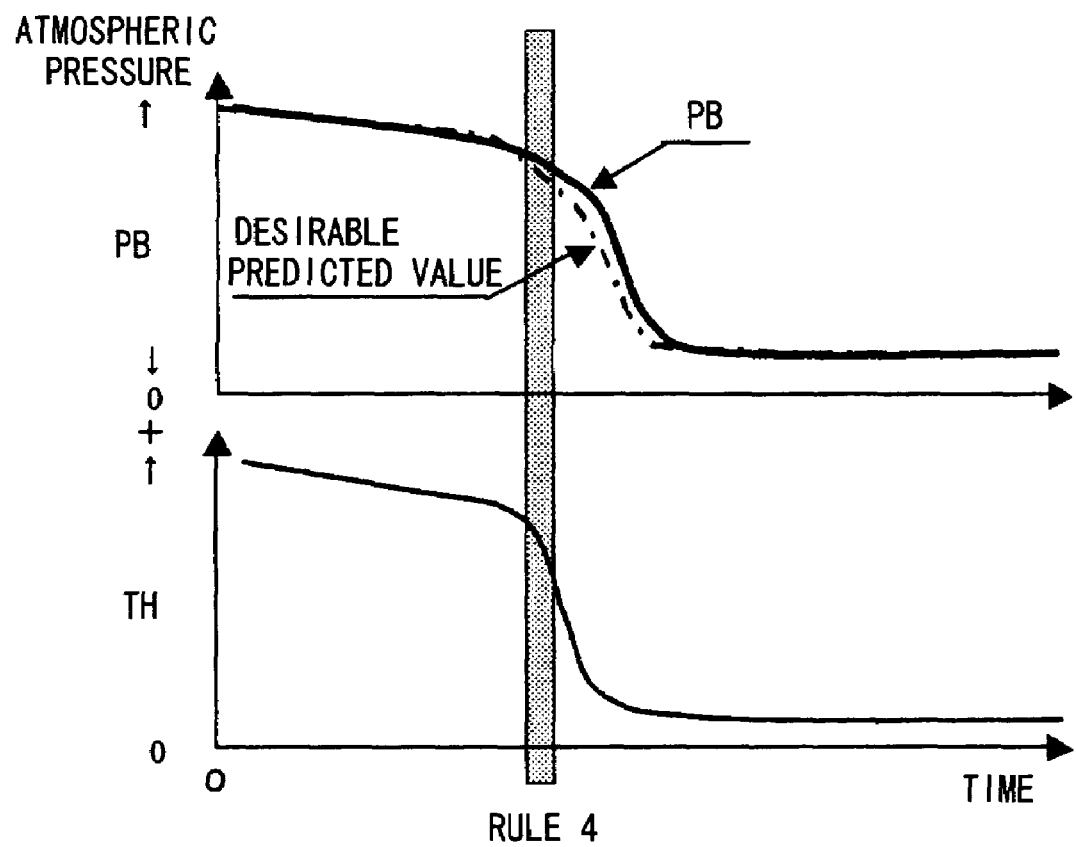
FIG. 10 shows a state to which Rule 4 is applied.

FIG. 10 shows a state in which ΔPB is zero and ΔTH is negative. Rule 4 is applied to the state. Since ΔTH which is ahead of ΔPB is negative, ΔFZPB of the membership function for the consequent part is set negative.

Figure 11:
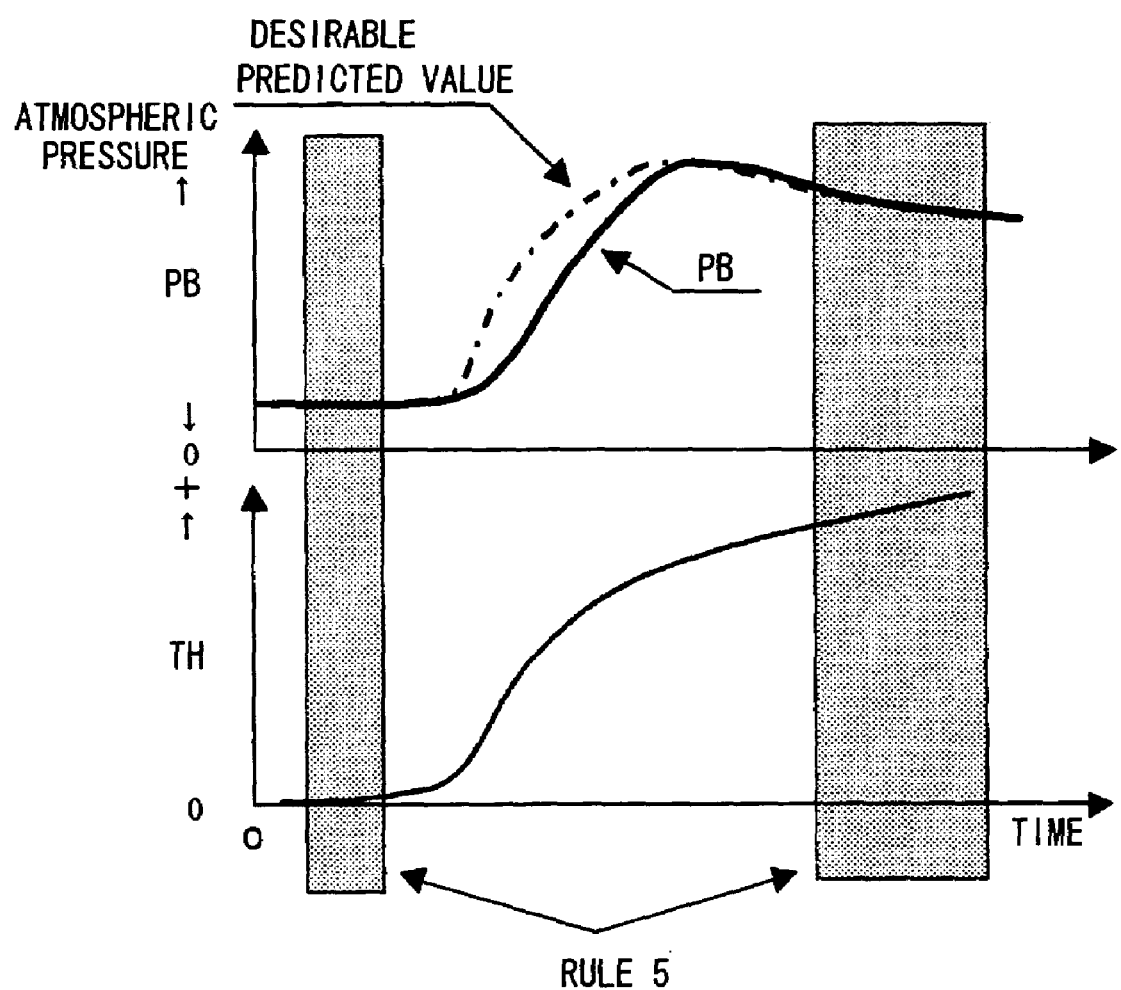
FIG. 11 shows a state to which Rule 5 is applied.

FIG. 11 shows a state in which both ΔPB and ΔTH are zero. Rule 5 is applied to the state. Since both ΔPB and ΔTH are zero, ΔFZPB of the membership function for the consequent part is also set zero.

Figure 12:
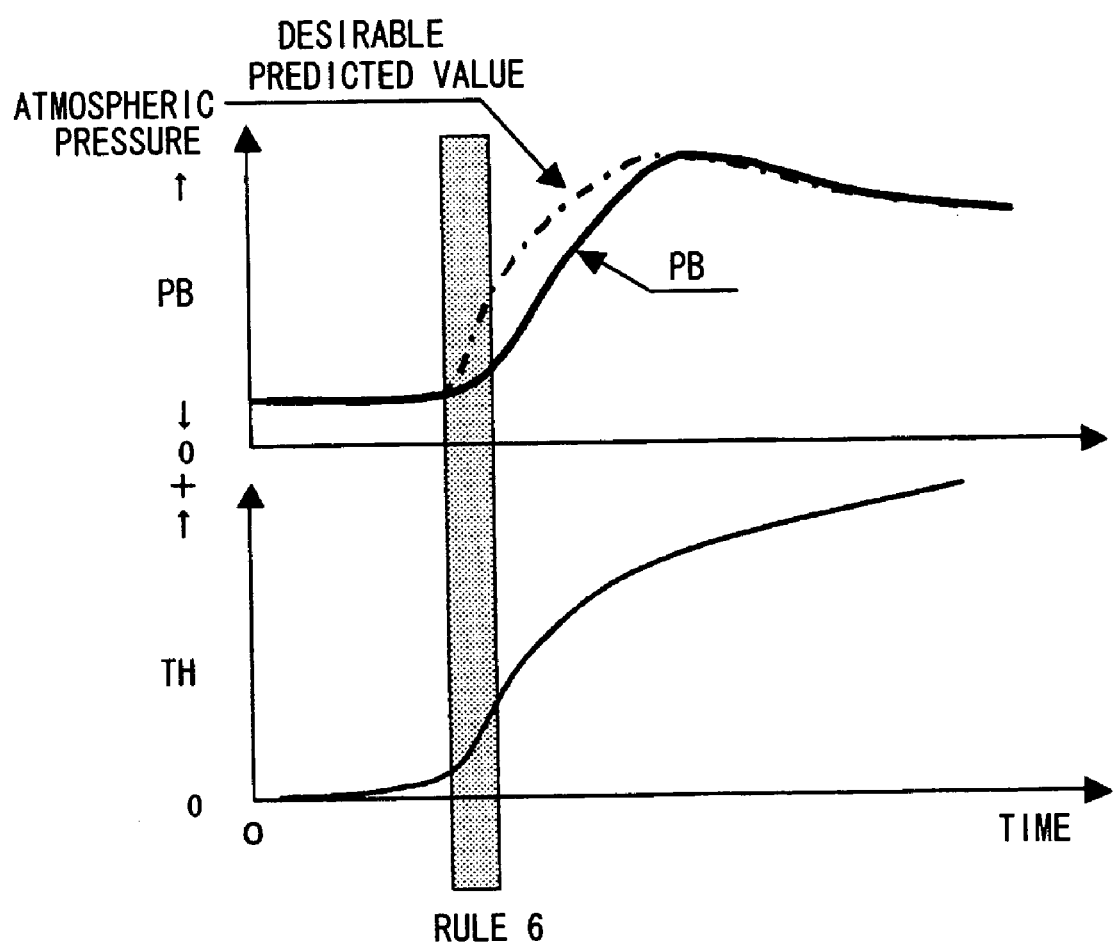
FIG. 12 shows a state to which Rule 6 is applied.

FIG. 12 shows a state in which ΔPB is zero and ΔTH is positive. Rule 6 is applied to the state. Since ΔTH which is ahead of ΔPB is positive, ΔFZPB of the membership function for the consequent part is set positive ($P_6$).

Figure 13:
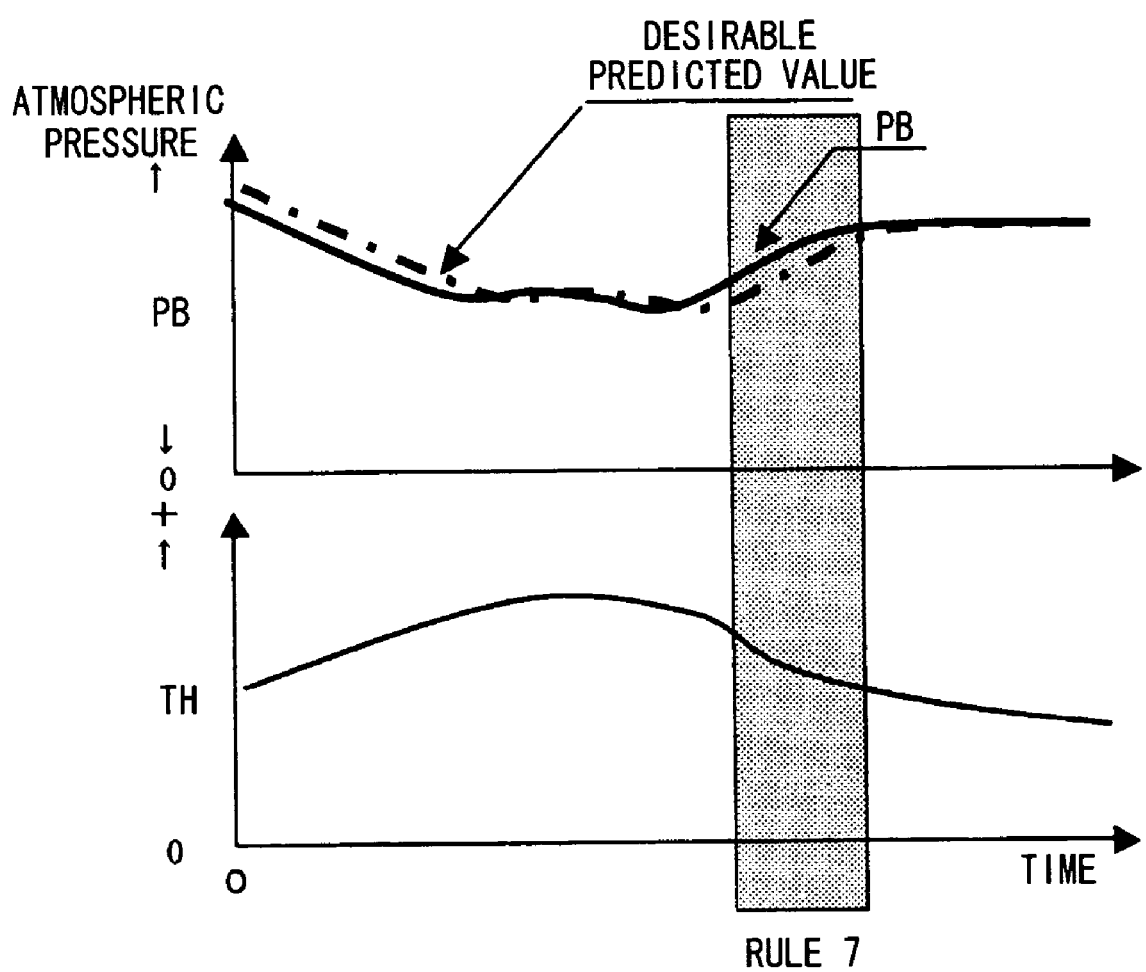
FIG. 13 shows a state to which Rule 7 is applied.

FIG. 13 shows a state in which ΔPB is positive and ΔTH is negative. Rule 7 is applied to the state. The state corresponds to the case in which due to an external force number of revolutions of the engine decreases more significantly than it would decrease due to decrease in TH. ΔFZPB of the membership function for the consequent is set zero.

Figure 14:
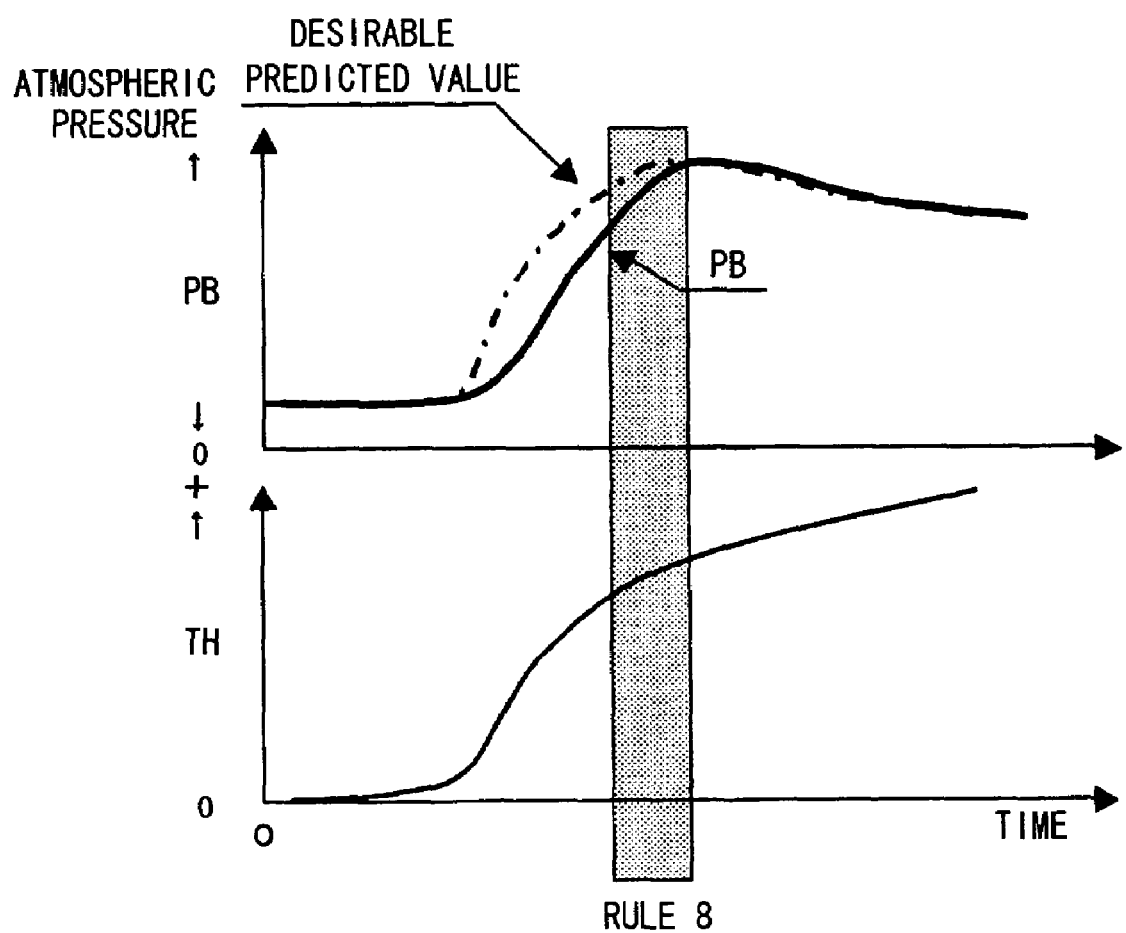
FIG. 14 shows a state to which Rule 8 is applied.

FIG. 14 shows a state in which ΔPB is positive and ΔTH is zero. Rule 8 is applied to the state. ΔFZPB of the membership function for the consequent is set positive ($P_8$). Since ΔTH which is ahead of ΔPB is zero, $P_8$ is set smaller than $P_6$ in Rule 6.

Figure 15:
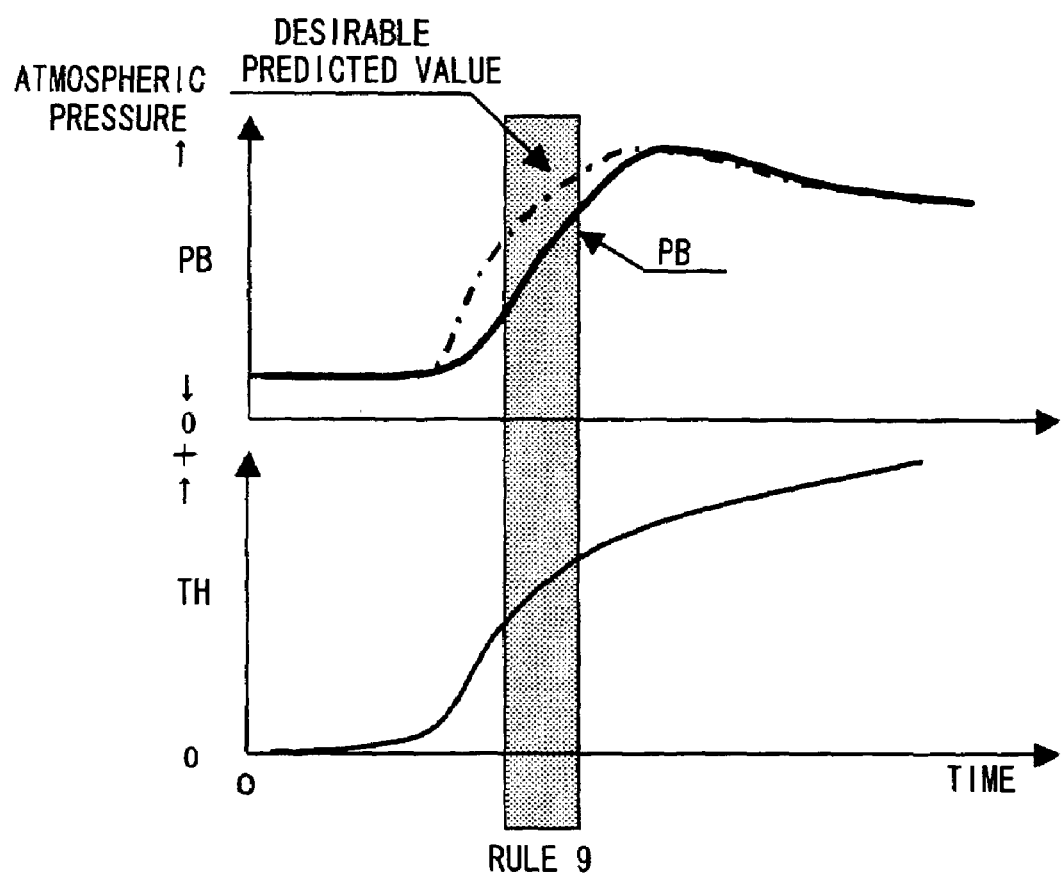
FIG. 15 shows a state to which Rule 9 is applied.

FIG. 15 shows a state in which both ΔPB and ΔTH are positive. Rule 9 is applied to the state. ΔFZPB of the membership function for the consequent is set positive ($P_{10}$). Since ΔPB has already been positive, $P_{10}$ is set smaller than $P_6$ in Rule 6 for the state in which ΔPB is zero.

Final ΔFZPB is calculated based on mini-max gravity method using the membership functions and fuzzy rules mentioned above. The method will be described in detail for the case to which Rule 6 is applied, as an example.

Now mini-max selection will be described. Current sample values of ΔPB and ΔTH are represented as ΔPB(k) and ΔTH(k). Degrees of fulfillment of these values for Rule 6 will be obtained. As shown in FIGS. 6 and 12, Rule 6 is applied to an area in which ΔPB is zero and ΔTH is positive. Thus the fulfillment of ΔPB for the membership function (zero) of the antecedent part is mΔPB(6) as shown in FIG. 16(a). Further, the fulfillment of ΔTH for the membership function (positive) of the antecedent part is mΔTH(6) as shown in FIG. 16(b). In mini-max selection, the smallest degree of fulfillment among the degrees of fulfillment for the antecedent part, is selected as the degree of fulfillment m(i) for rule i. The following relationship is established.

$$mΔPB(6) < mΔTH(6) \quad (4)$$

Accordingly, for the degree of fulfillment for Rule 6, mΔPB(6) is selected.

$$m(6) = mΔPB(6) \quad (5)$$

Figure 17:
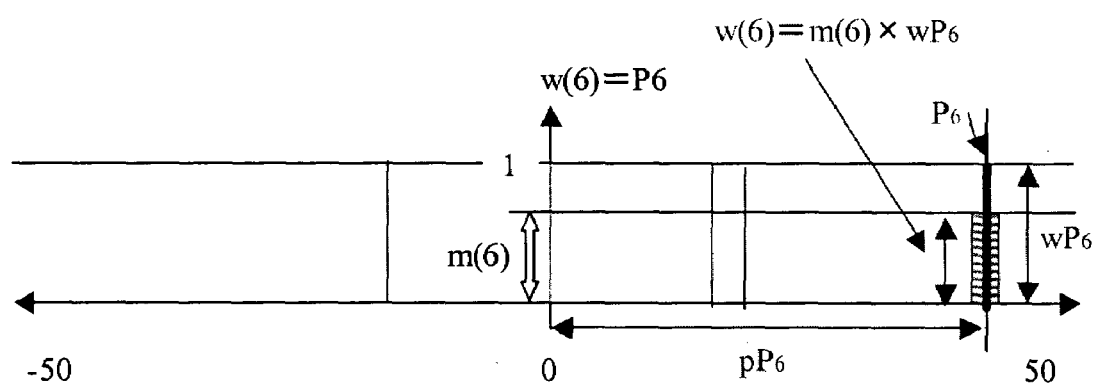
FIG. 17 shows a method by which a weight of Rule 6 is obtained based on the membership function for the consequent part.

Further, a position of the membership function of the consequent part for Rule 6 is pP6 and a reference weight (length of bar) of that is wP6 as shown in FIG. 17. Accordingly, weight of Rule 6 in estimation of ΔFZPB, that is weight w(6) at position pP, will be given as below.

$$w(6) = m(6) \times wP6 \quad (6)$$

Then, a weight w(i) is obtained for each rule i in a similar way. All the weights thus obtained are used for estimation and therefore this is "max" selection.

Estimation of ΔFZPB, that is defuzzification of a fuzzy output will be carried out using a gravity method shown in the following equation, based on weights for the rules.

$$\Delta FZPB(k) = \frac{\sum_{i=1}^{9} w(i) \times wPi \times pPi}{\sum_{i=1}^{9} w(i) \times wPi} \quad (7)$$

Thus, equation (3) is represented as below and ΔFZPB(k) can be calculated through it.

$$\Delta FZPB(k) == PB(k) = \frac{\sum_{i=1}^{9} w(i) \times wPi \times pPi}{\sum_{i=1}^{9} w(i) \times wPi} \quad (8)$$

Figure 1:
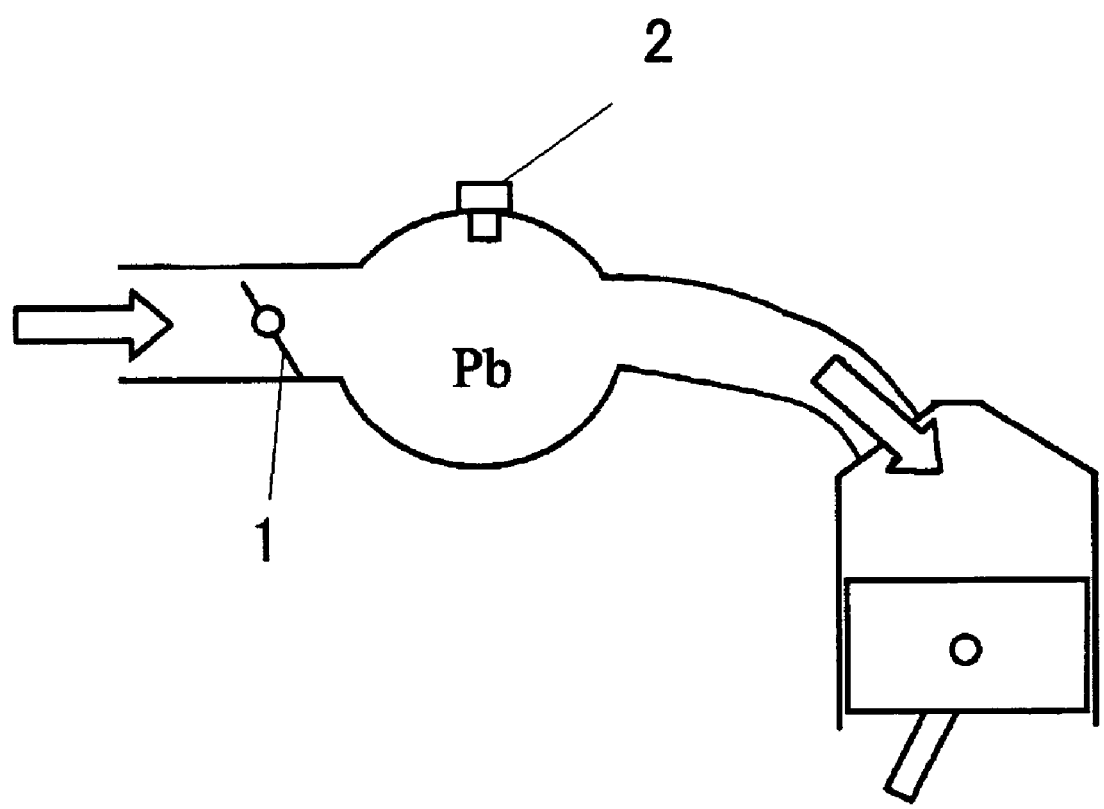
FIG. 1 shows an intake portion of an internal-combustion engine.
Figure 2:
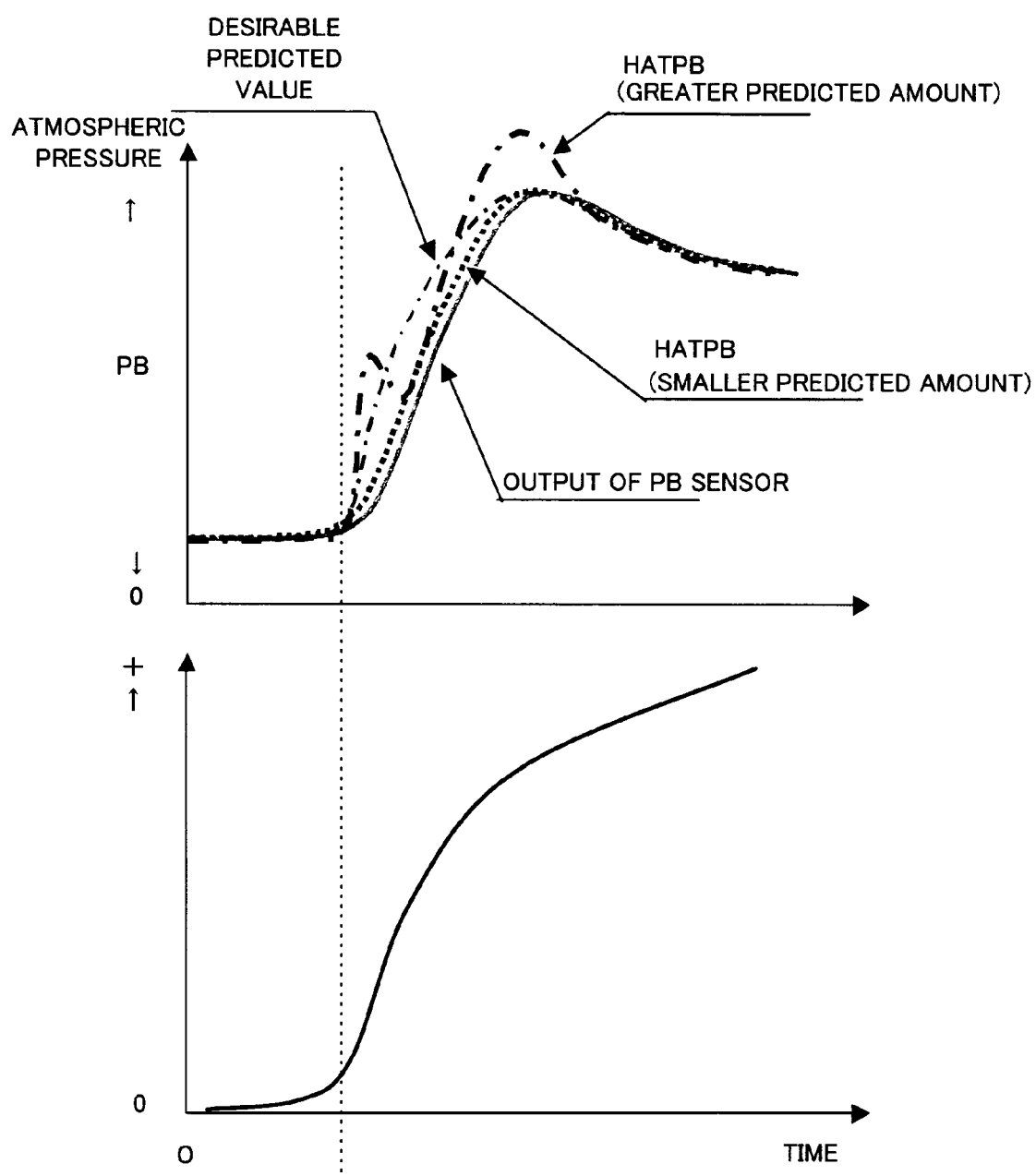
FIG. 2 shows behaviors of a value predicted by conventional algorithms for predicting intake manifold pressure.
Figure 18:
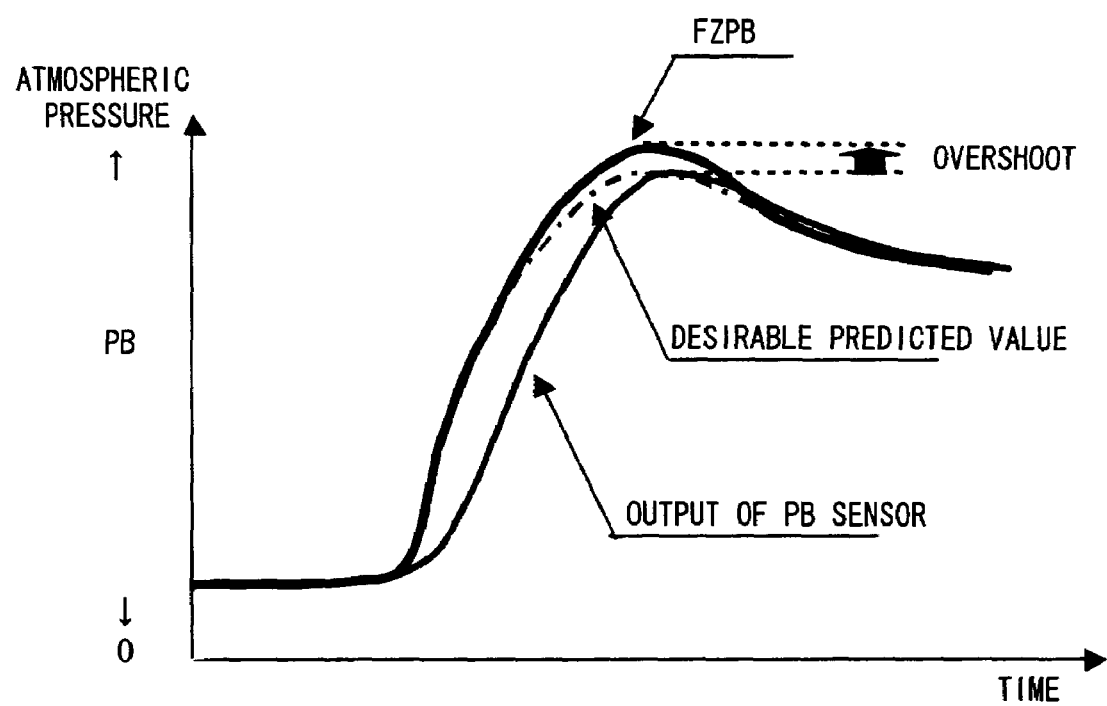
FIG. 18 shows the result of estimation of FZPB using the fussy inference algorithm according to an embodiment of the present invention.

FIG. 18 shows the result of estimation of FZPB using the fussy inference algorithm mentioned above. In FIG. 18 FZPB is closely analogous to the desirable predicted value, even though there exists some overshoot against the desirable predicted value. Thus, accuracy of estimation has significantly increased compared with that of the conventional algorithm shown in FIG. 2.

Now another embodiment of the present invention will be described below. The prediction with fuzzy reasoning in the embodiment mentioned above, produces some overshoot as shown in FIG. 18. Such an overshoot tends to occur particularly under hard acceleration or snap. In order to eliminate such an overshoot, a change in ΔPB, that is second order difference of PB (hereinafter referred to as ΔΔPB) should be noted. ΔΔPB is defined by the following equation where "k" indicates a point in control time synchronized with intake stroke (TDC).

$$\Delta\Delta PB(K) = \Delta PB(k) 31 \Delta PB(K-1) \quad (9)$$

Further, fuzzy rules will be defined based on an amount of ΔPB, that of ΔTH and that of ΔΔPB. Thus, the three kinds of classifications due to an amount of ΔPB, that of ΔTH and that of ΔΔPB, generate 27 areas, for each of which a fuzzy rule is provided. FIG. 20 shows fuzzy rules according to the present embodiment. Fuzzy rules shown in FIG. 20 are positioned in three dimensions, while those shown in FIG. 6 are positioned in two dimensions. It should be noted here that ΔΔPB contains information on behaviors of ΔPB in the future. Accordingly, use of fuzzy rules based on an amount of ΔΔPB allows a control containing information on the information on behaviors of ΔPB in the future. FIG. 19 shows the membership functions of the antecedent part according to the present embodiment.

Compared with fuzzy rules shown in FIG. 6, in FIG. 20 Rule 8 and Rule 9 alone differ respectively when ΔΔPB is positive and when ΔΔPB is negative. The other rules remain unchanged independently of ΔΔPB.

Now new rules (Rules 10 and 11 in FIG. 20) will be described with reference to drawings.

Figure 22:
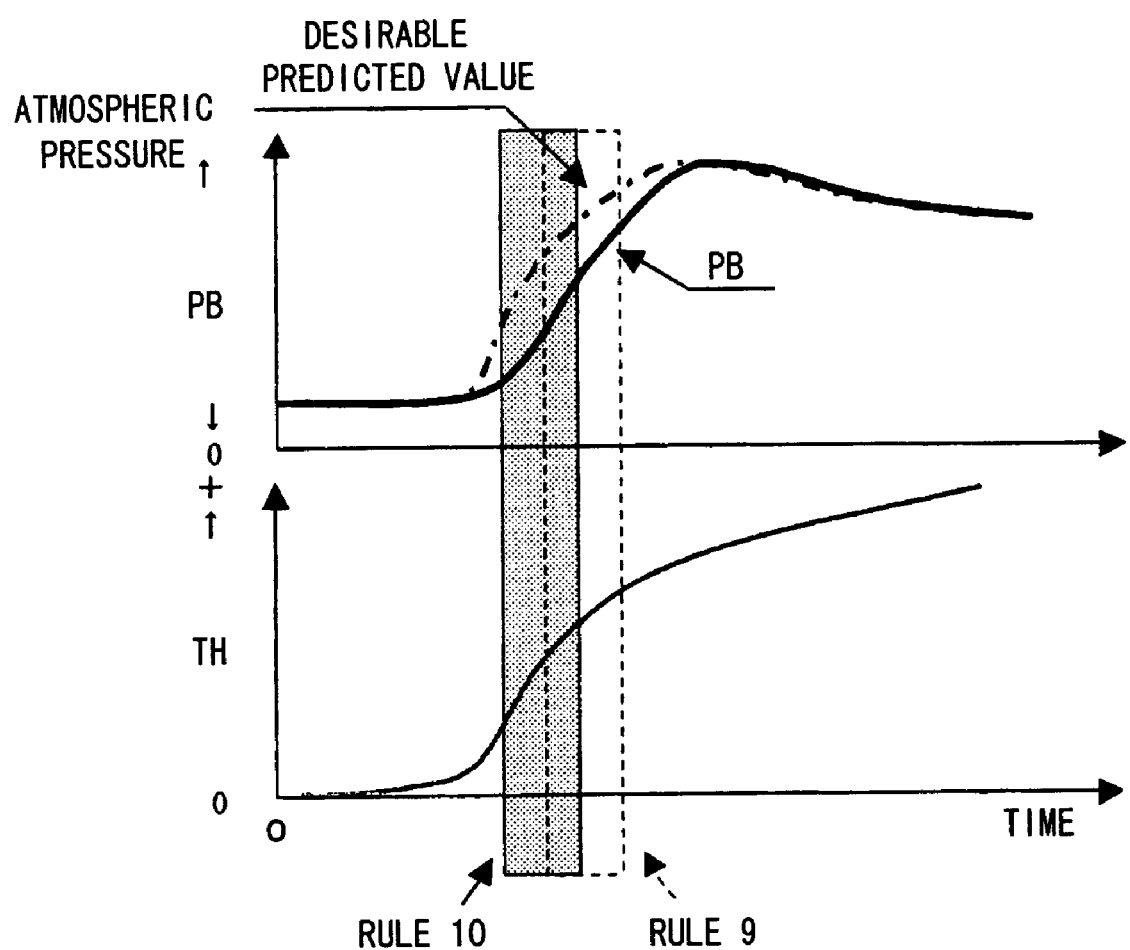
FIG. 22 shows a state to which Rule 10 is applied.

FIG. 22 shows a state in which ΔPB, ΔTH and ΔΔPB are positive. Rule 10 is applied to the state. Since ΔPB, ΔTH and ΔΔPB are positive, ΔFZPB of the membership function for the consequent is set to the largest positive value ($P_{10}$).

Figure 23:
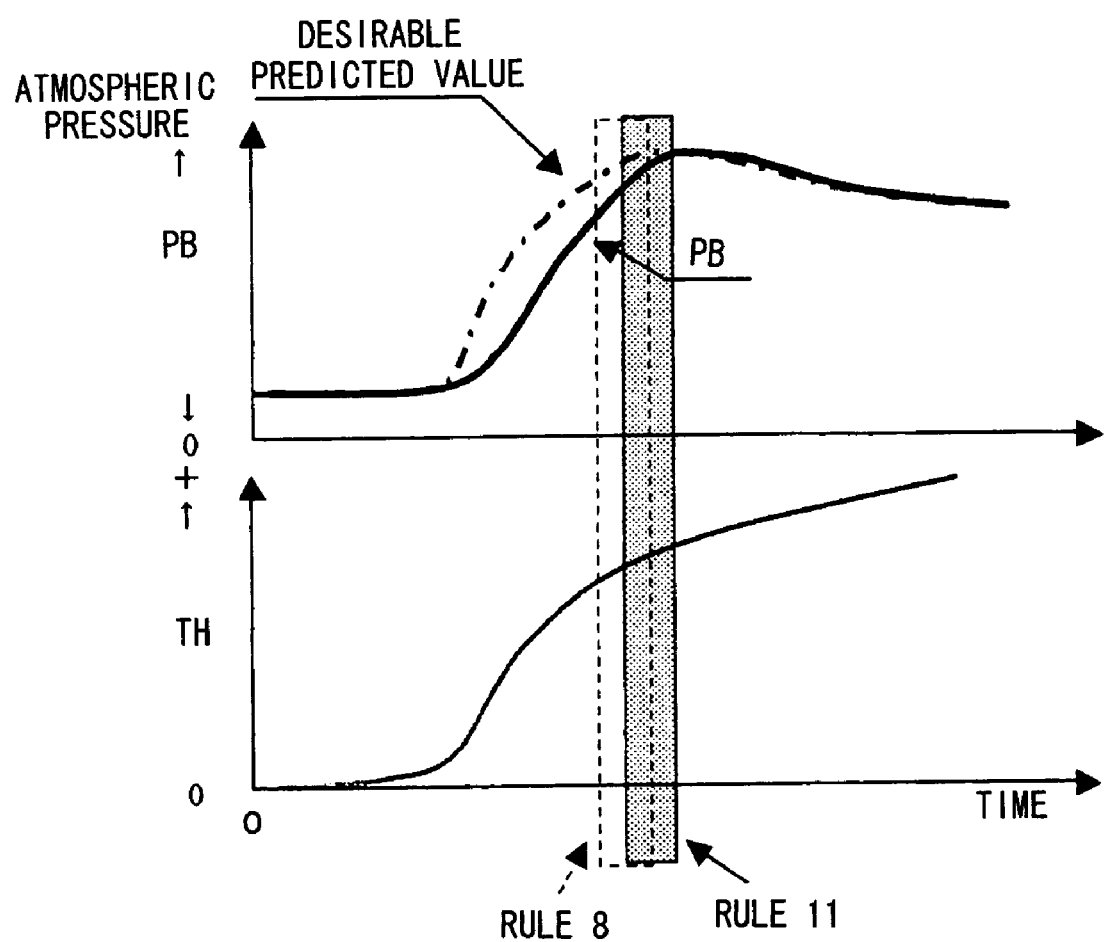
FIG. 23 shows a state to which Rule 11 is applied.

FIG. 23 shows a state in which ΔPB is positive, ΔTH is zero and ΔΔPB is negative. Rule 11 is applied to the state. ΔFZPB of the membership function for the consequent part is set zero.

Figure 24:
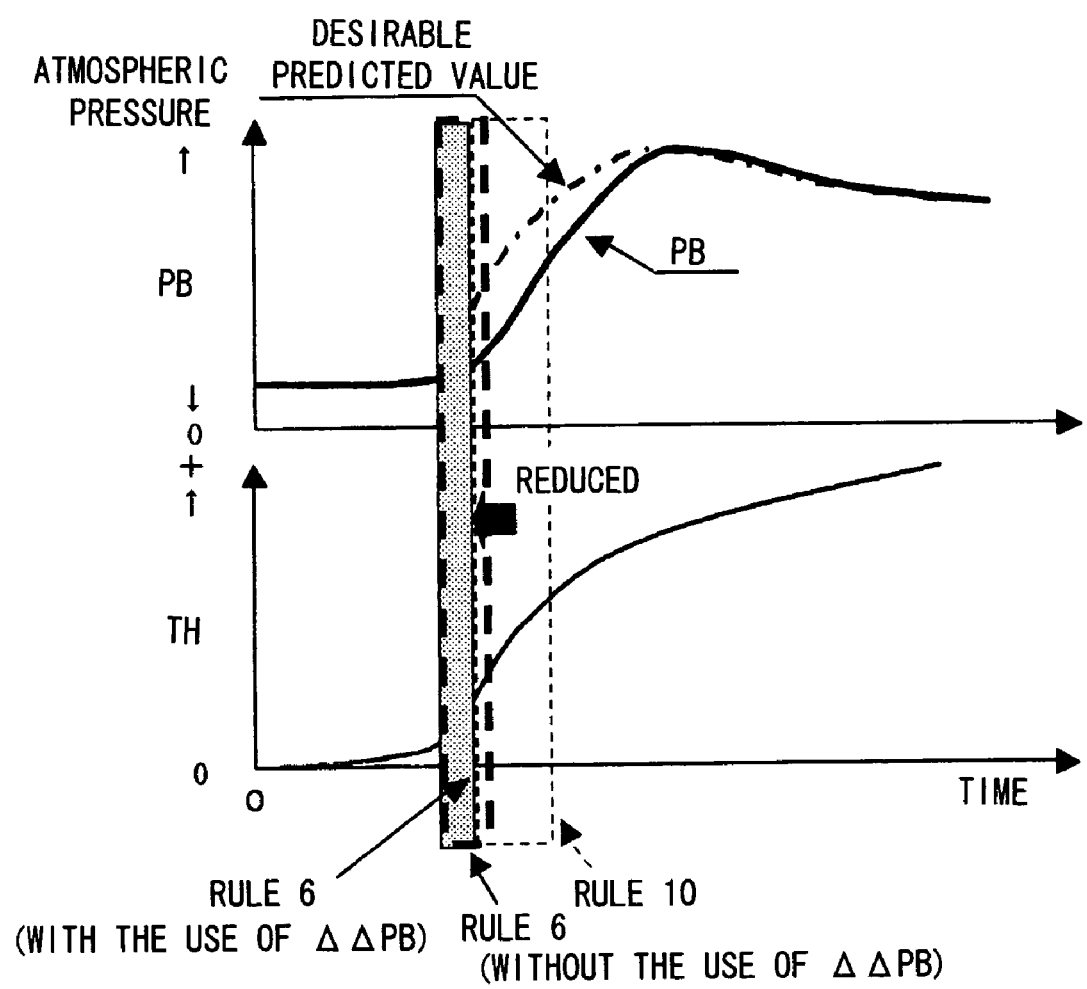
FIG. 24 shows a state to which Rule 6 is applied according to another embodiment of the present invention.

FIG. 24 shows a state in which ΔPB is zero and ΔTH is positive, according to the present embodiment. Rule 6 is applied to the state. As mentioned above, Rule 10 is applied to a state in which ΔPB, ΔTH and ΔΔPB are positive. Accordingly, an area to which Rule 6 is applied is reduced, compared with the case in which ΔΔPB is not used.

Figure 25:
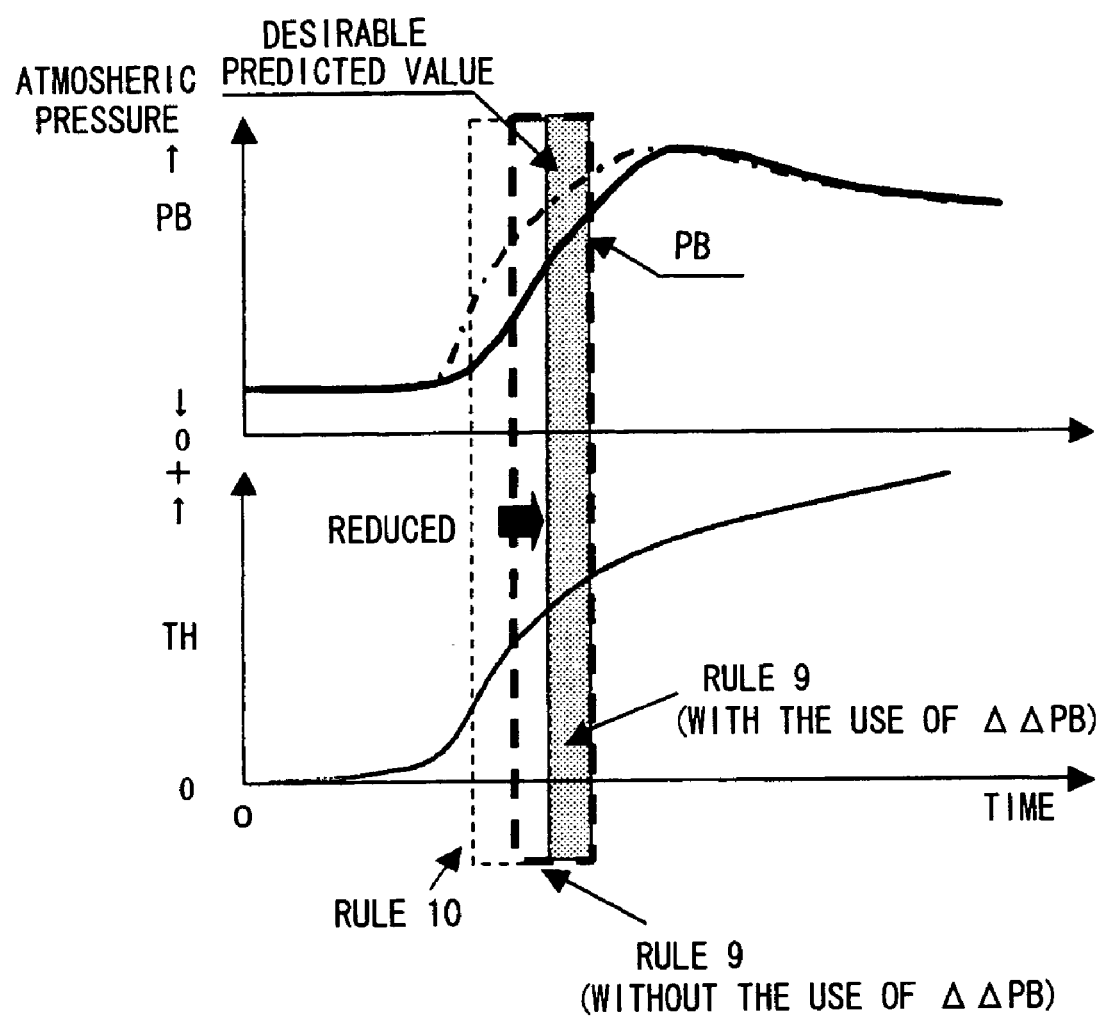
FIG. 25 shows a state to which Rule 9 is applied according to another embodiment of the present invention.

FIG. 25 shows a state in which both ΔPB and ΔTH are positive, according to the present embodiment. Rule 9 is applied to the state. As mentioned above, Rule 10 is applied to a state in which ΔPB, ΔTH and ΔΔPB are positive. Accordingly, an area to which Rule 9 is applied is reduced, compared with the case in which ΔΔPB is not used.

Figure 21:
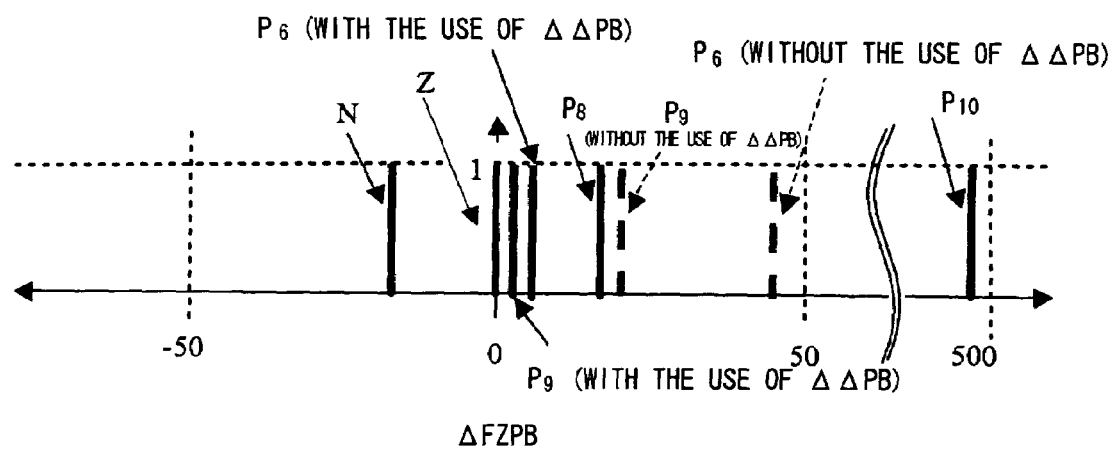
FIG. 21 shows the membership function of the consequent part according to another embodiment of the present invention.

FIG. 21 shows the membership function of the consequent part according to the present embodiment. As mentioned above, $P_{10}$ is the largest positive value. Compared with the membership function of the consequent part shown in FIG. 5, pP6 (position of $P_6$) and pP9 (position of $P_9$) has approached zero. The reason is that areas to which Rule 6 and Rule 9 are applied, have been reduced.

Figure 26:
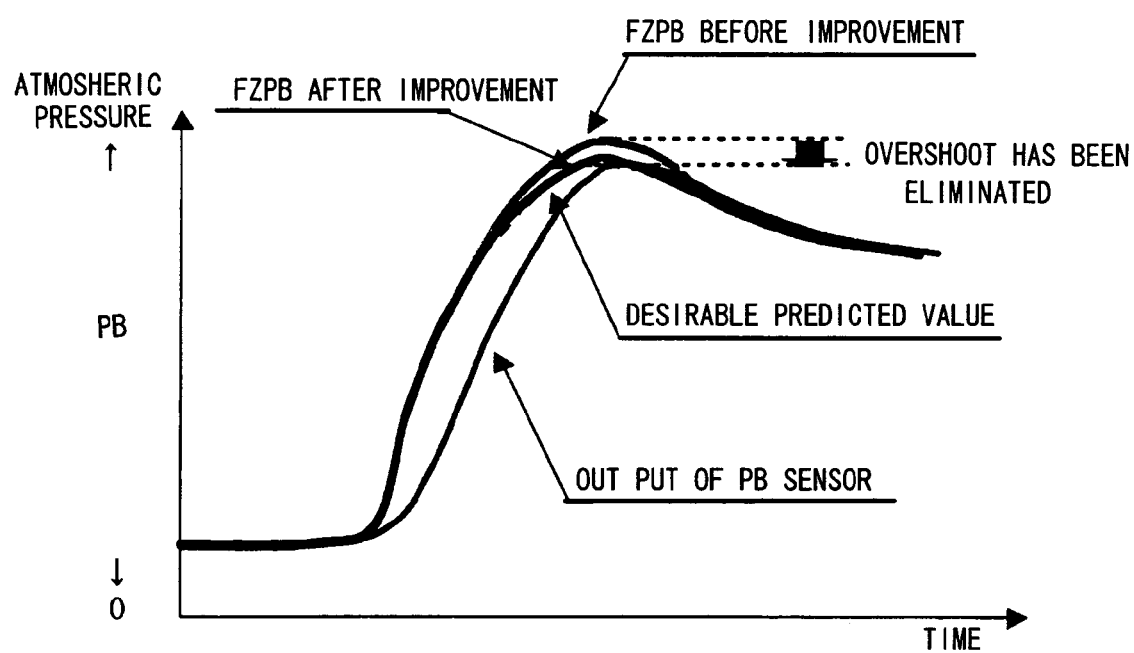
FIG. 26 shows the result of estimation of FZPB using the fussy inference algorithm according to another embodiment of the present invention.

FIG. 26 shows the result of estimation of FZPB using the fussy inference algorithm according to the present embodiment. In FIG. 26 such an overshoot as shown in FIG. 18 has been eliminated.

In the present embodiment when a time delay to be compensated is small, $P_6$ and $P_9$ having approached zero, can be set zero for the sake of simplifying data setting. Further, the state to which Rule 8 is applied and in which ΔΔPB is positive, rarely occurs. Accordingly, this rule may be eliminated, or the consequent part may be set zero to invalidate its contributions to the prediction.

Now embodiments in which an input is subjected to filtering, will be described. The present invention employs algorithm of estimation with fuzzy reasoning, using ΔPB, ΔTH and ΔΔPB as inputs. Accordingly, if noises are mixed into TH and/or PB, the values of difference and second order difference will be oscillating or have spikes. As a result, FZPB estimated through estimation with fuzzy reasoning will also be oscillating or have spikes at times.

Figure 27:
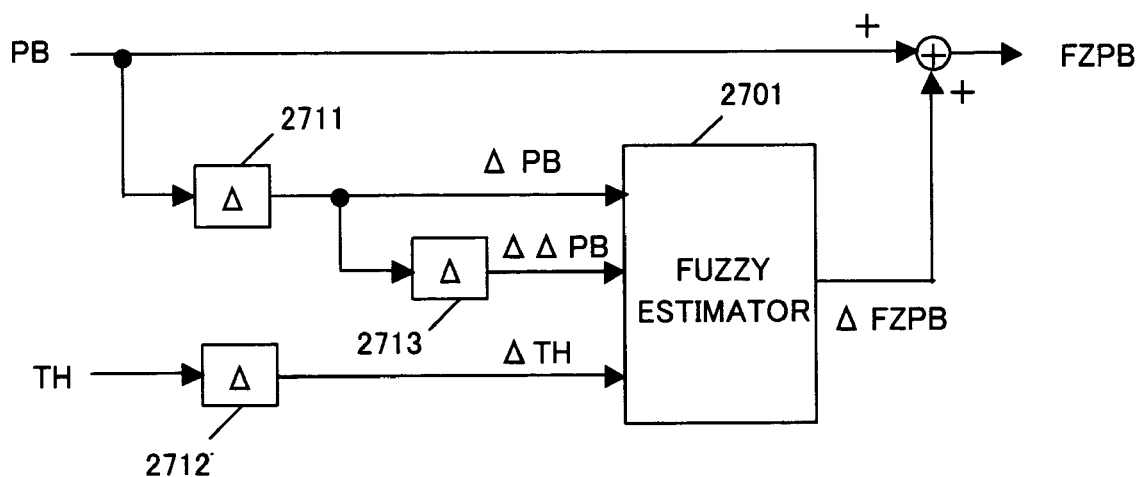
FIG. 27 shows a fuzzy estimator according to an embodiment of the present invention.
Figure 28:
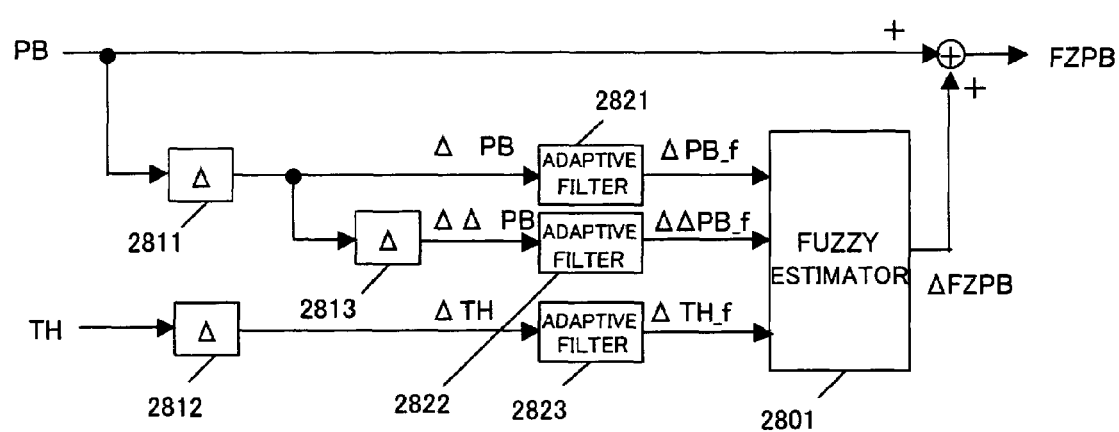
FIG. 28 shows a fuzzy estimator provided with adaptive filters according to an embodiment of the present invention.

In the present embodiment, ΔPB, ΔTH and ΔΔPB are subjected to filtering and then input to a fuzzy estimator as shown FIG. 28. On the contrary, in FIG. 27 ΔPB, ΔTH and ΔΔPB are input to a fuzzy estimator. In FIG. 27 devices for obtaining difference are represented with reference numerals 2711 to 2713 and a fuzzy estimator is represented with reference numeral 2701. In FIG. 28 devices for obtaining difference are represented with reference numerals 2811 to 2813, filters are represented with reference numerals 2821 to 2823 and a fuzzy estimator is represented with reference numeral 2801.

Figure 29:
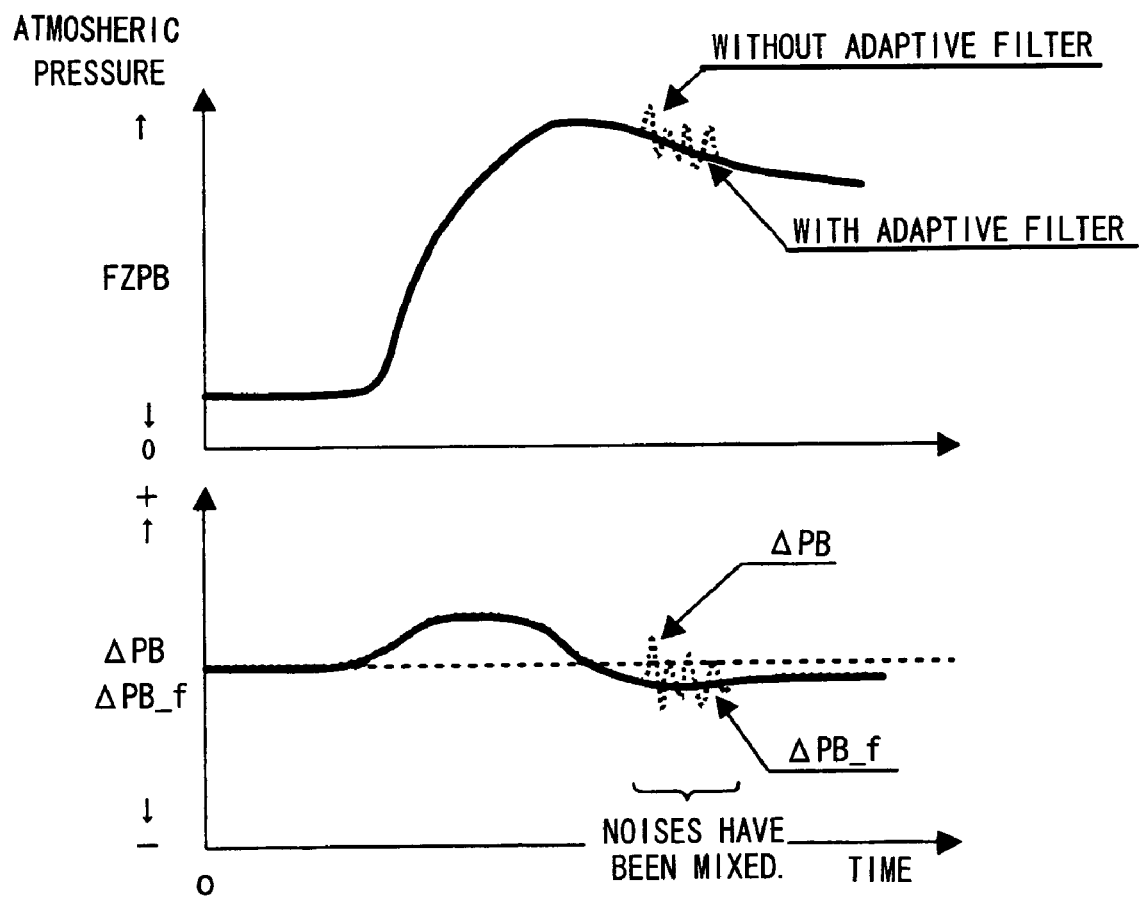
FIG. 29 shows behaviors of FZPB with and without the use of adaptive filters.

As the filters for ΔPB, ΔTH and ΔΔPB, such an adaptive filter as represented in the following equations, is employed. This type of filters prevents FZPB from oscillating or having spikes due to noises as shown in FIG. 29.

$$Xf(k)=X\_f(k-1)+KP(k)\cdot ide(k) \tag{10}$$

$$KP(k)=P(k-1)/(1+P(k-1)) \tag{11}$$

$$ide(k)=X_{13}f(k-1)-X(k) \tag{12}$$

$$P(k+1)=(1/\lambda_1)[1-\lambda_2\cdot P(k)/(\lambda_1+\lambda_2\cdot P(k))] \tag{13}$$

X_f represents adaptive filter values for ΔPB, ΔTH and ΔΔPB, while X represents sample values of ΔPB, ΔTH and ΔΔPB. $\lambda_1$ and $\lambda_2$ represent weighting parameters.

Now, another embodiment will be described, in which TH is determined in consideration of time delay, based on a desired value of throttle opening. Recently an electronically controlled throttle has been widely employed to fill the need for coordinated control with the transmission for better fuel economy and for control for stabilizing steering. An electronically controlled throttle is often driven by a driver separate from the electronic control unit. The driver is connected to the electronic control unit via a network on the vehicle (CAN or the like).

Figure 30:
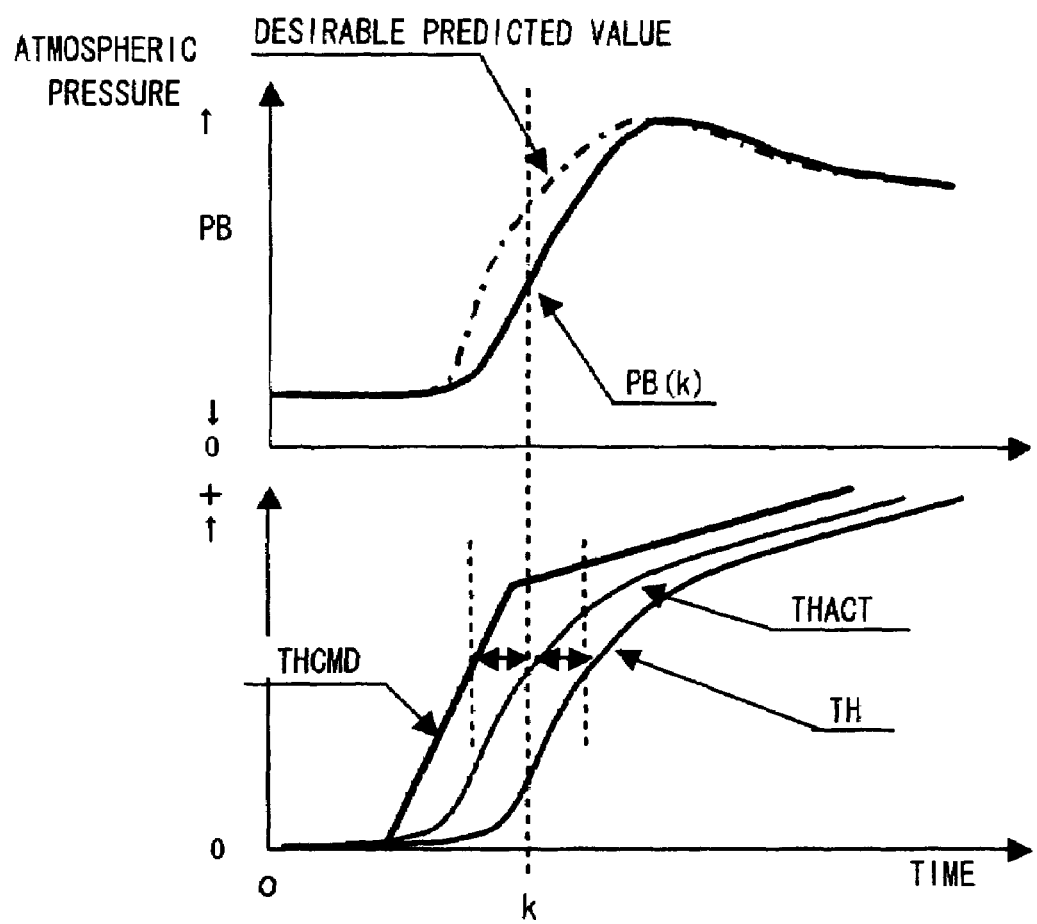
FIG. 30 shows a state in which an electronically controlled throttle is used.

Accordingly, a period (10 milliseconds) of communication between the electronic control unit and the driver, causes a time delay between throttle opening command THCMD calculated by the electronic control unit and an actual throttle opening THACT of the electronically controlled throttle. That is, a time delay occurs before THCMD exerts an influence upon TH. Further, another time delay occurs before THACT exerts an influence upon TH observed by the electronic control unit via the CAN or the like. FIG. 30 shows a state in which an electronically controlled throttle is used. In FIG. 30 THCMD represents a command (reference) of throttle opening, THACT represents an actual throttle opening and TH represents an (observed) value of throttle opening, as mentioned above.

Thus, a change in TH observed by the electronic control unit lags behind a change in PB and therefore ΔTH cannot be used to predict PB as in the algorithm of estimation with fuzzy reasoning mentioned above.

Accordingly, in the present embodiment THHAT is estimated based on THCMD in consideration of a time delay due to communication and a delay in response of the electronically controlled throttle, as described below. A difference in THHAT, that is Δ□□HAT is used instead of ΔTH.

$$THHAT(k)=Kdly\times THHAT(k)+(1-Kdly)\times THCMD(k-ddly) \tag{14}$$

$$\Delta THHAT(k)=THHAT(k)-THHAT(k-1) \tag{15}$$

ddly represents a value corresponding to a time delay and Kdly represents a constant.

Figure 31:
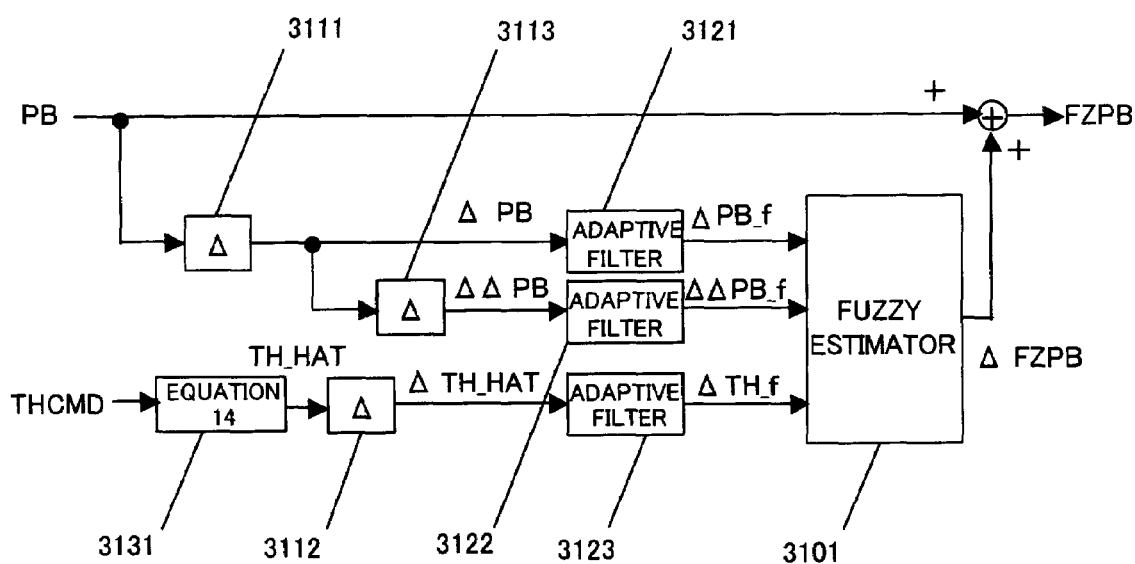
FIG. 31 shows a fuzzy estimator for the use with an electronically controlled throttle.
Figure 32:
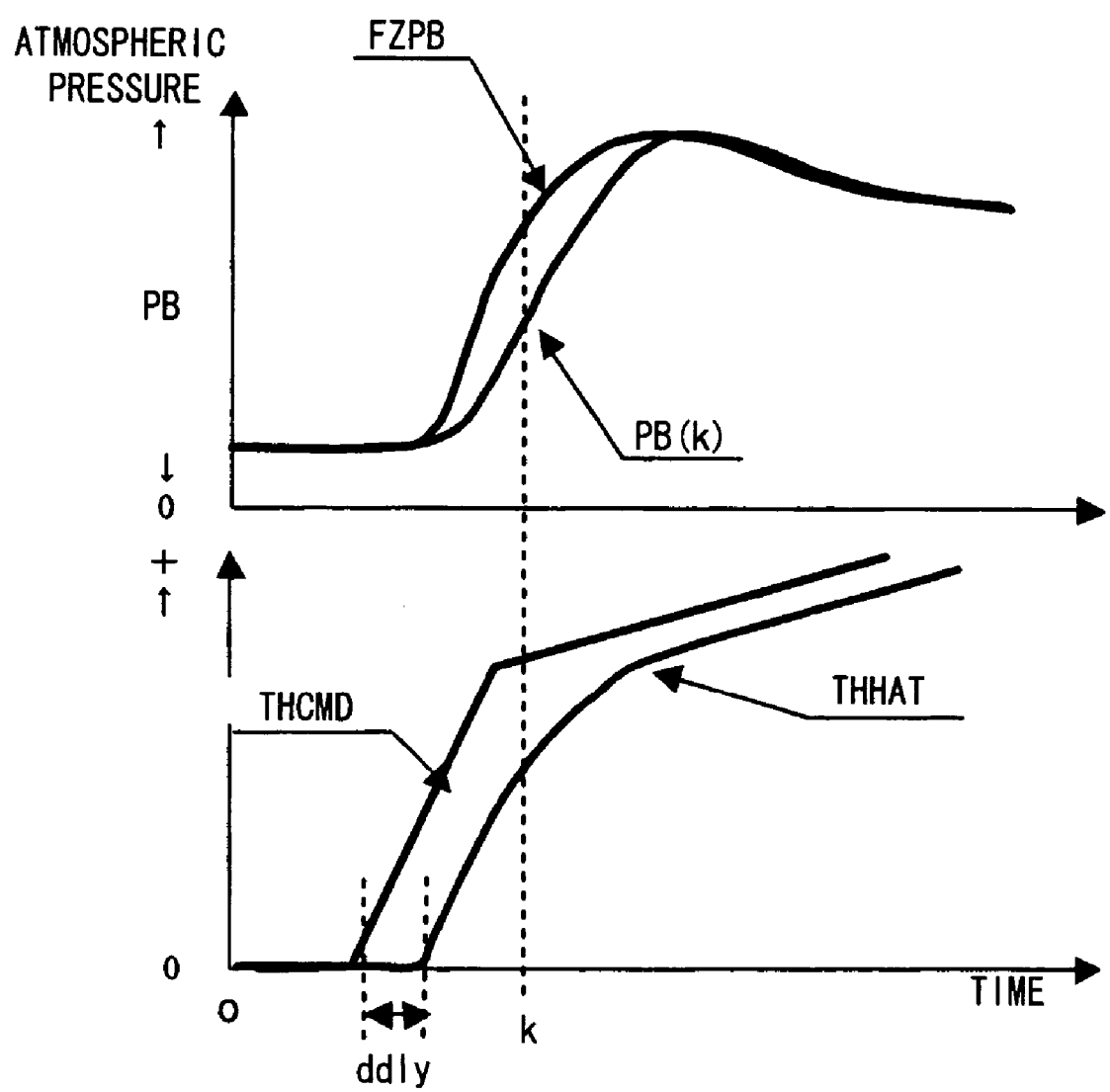
FIG. 32 shows the result of prediction of a fuzzy estimator for the use with an electronically controlled throttle.

FIG. 31 shows a system configuration including devices and FIG. 32 shows the result of prediction, according to the present embodiment. In FIG. 31 devices for obtaining difference are represented with reference numerals 3111 to 3113, filters are represented with reference numerals 3121 to 3123, a module for carrying out operation represented by Equation (14) is represented with reference numeral 3131 and a fuzzy estimator is represented with reference numeral 3101.

Figure 33:
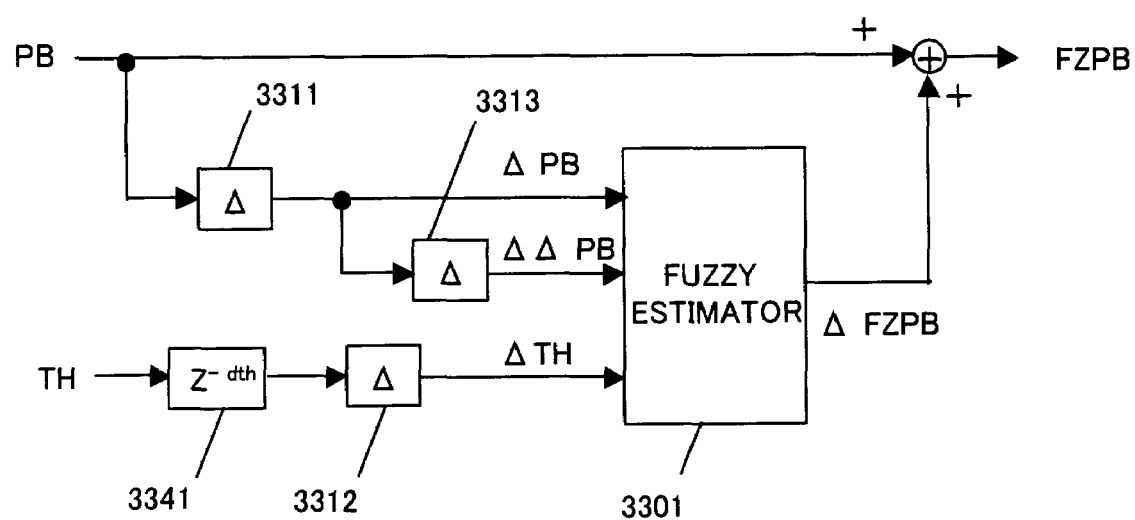
FIG. 33 shows a fuzzy estimator for the use with a large-volume intake manifold.

Now, another embodiment in which TH is delayed by a time delay, will be described. Recently a volume of the intake manifold of the engine in many cars has been made very large to fill the need for a larger torque at lower speeds. In these cases a change in an actual pressure at the intake manifold, lags a time delay dth behind a change in TH. Under the situation a change in TH is too ahead of a change in an actual pressure at the intake manifold to use TH for operations for prediction of an actual pressure at the intake manifold. In order to solve this problem, TH is delayed by a time delay dth before being used in operations for prediction. In FIG. 33 devices for obtaining difference are represented with reference numerals 3311 to 3313, a time delay module is represented with reference numeral 3341 and a fuzzy estimator is represented with reference numeral 3301.

Figure 34:
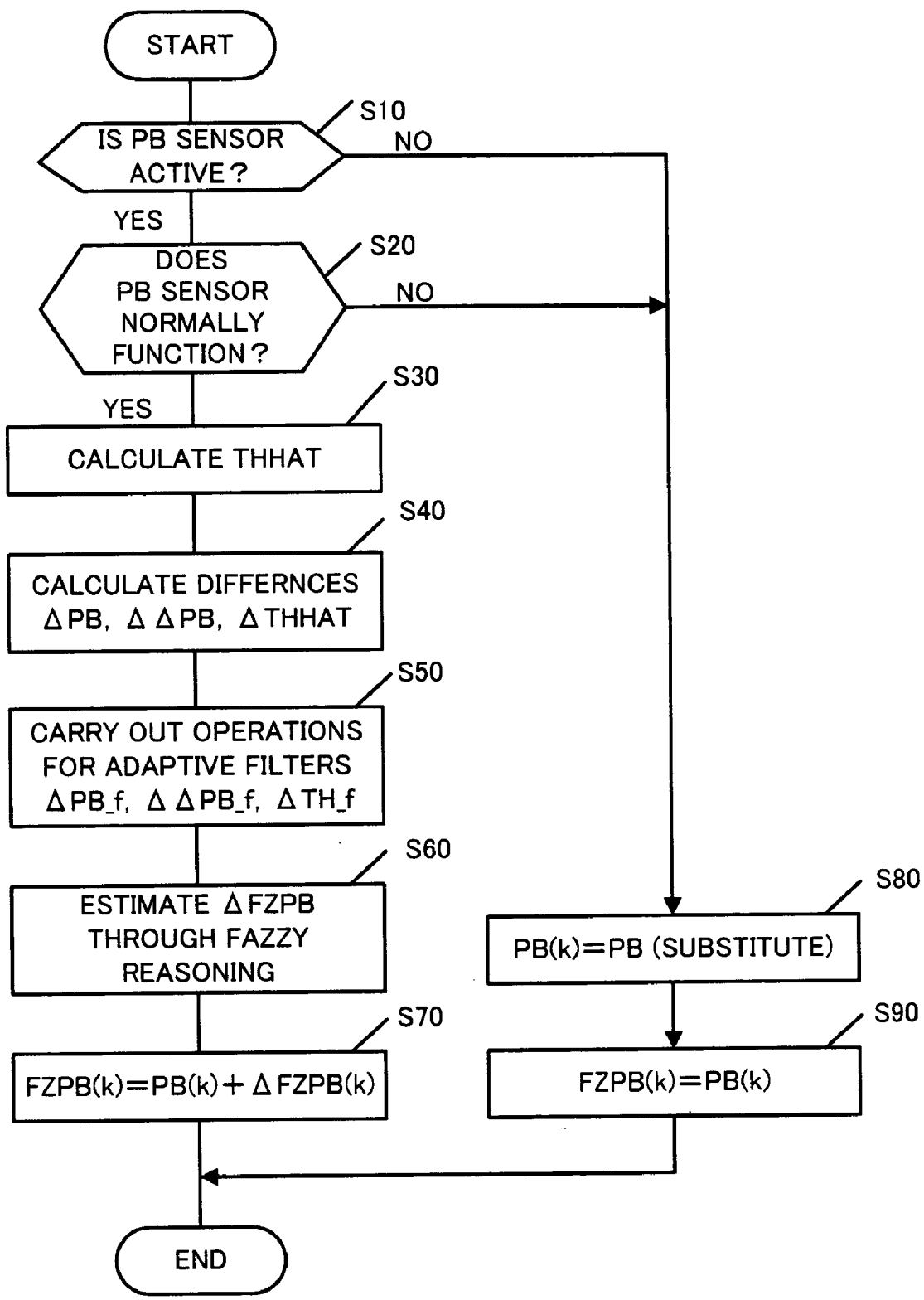
FIG. 34 shows a procedure of the embodiment of the present invention in which adaptive filters are used.

A procedure of the embodiment of the present invention in which adaptive filters are used, will be described with reference to a flowchart shown in FIG. 34. In step S10 a PB sensor is checked for whether it is active or not. If the PB sensor is not active, the process proceeds with step S80, in which a substitute value is given for a sample value of PB. Further, in step S 90 the substitute value as the sample value is set to FZPB and the process is terminated. If the PB sensor is active, the process proceeds with step S 20, in which the PB sensor is checked for whether it normally functions or not. If it does not normally function, the process proceeds with step S 80. If it normally functions, the process proceeds with step S 30, in which an estimated value THHAT of TH is calculated (Equation (14)). THHAT is used instead of TH for the case of an electronically controlled throttle. Then, the process proceeds with step S40, in which ΔPB, ΔΔPB and ΔTHHAT are calculated (Equations (2), (7) and (14)). Further, the process proceeds with step S50, in which operations for adaptive filters are carried out (Equations (10) to (13)). Then, in step S60 ΔFZPB is estimated. In step S70 ΔFZPB is added to a sample value of PB to obtain FZPB and the process is terminated.

Figure 35:
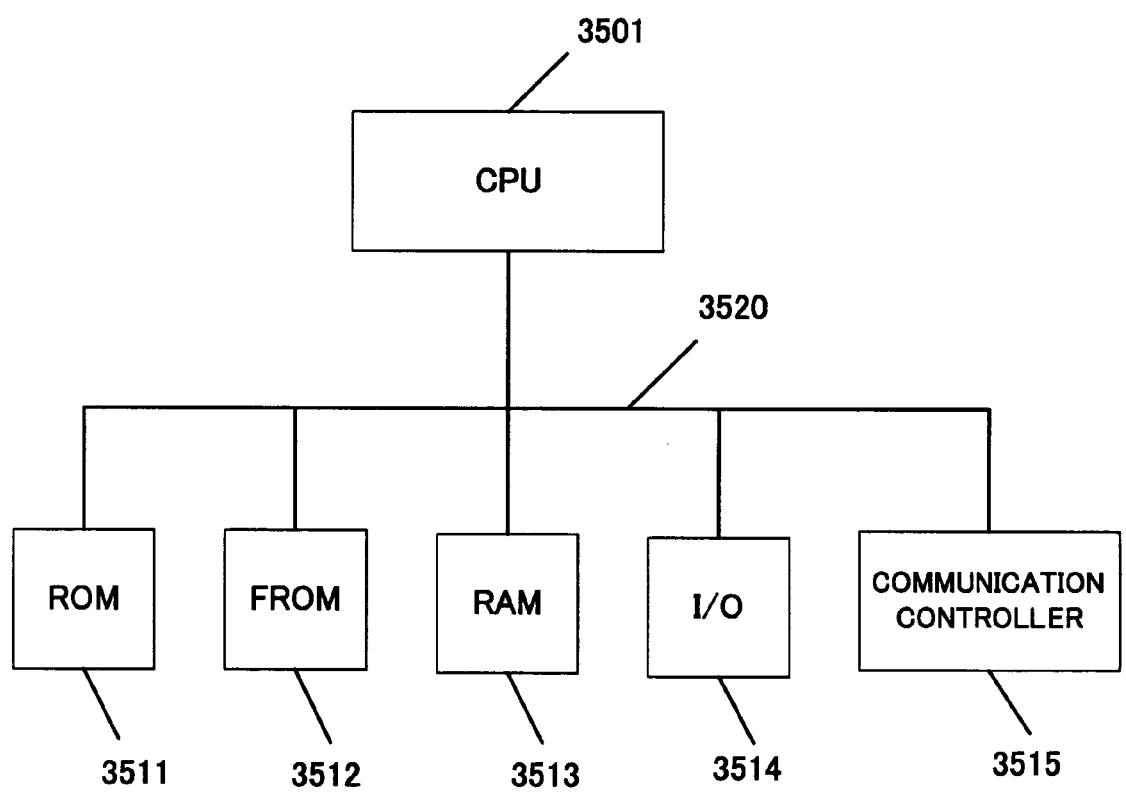
FIG. 35 shows an example of an electronic control unit used in embodiments of the present invention.

An example of an electronic control unit used in embodiments of the present invention, will be described with reference to FIG. 35. The electronic control unit includes a CPU 3501, a ROM 3511, a flash memory 3512, a RAM 3513, an I/O unit 3514 and a communication controller 3515 for a network on the vehicle. The above devices are connected with one another via a bus 3520.

Algorithm for predicting intake manifold pressure according to the present invention, may be stored as a program in the ROM 3511 or the flash memory 3512. Some part of the algorithm, for example fuzzy rules, may be stored in the flash memory 3512, while the other part may be stored in the ROM 3511. Alternatively, the algorithm may be stored in another type of memory not shown in the drawing.

What is claimed is:

1. A method for predicting intake manifold pressure, said method comprising the steps of:
obtaining a difference of values of intake manifold pressure and a difference of values of throttle opening;
obtaining a predicted difference of values of intake manifold pressure by estimating with fuzzy reasoning, including fuzzy rules determined based on an amount of the difference of values of intake manifold pressure and an amount of the difference of values of throttle opening; and
adding the predicted difference of values of intake manifold pressure, to a value of intake manifold pressure, to obtain a predicted value of intake manifold pressure.

2. A method for predicting intake manifold pressure according to claim 1, wherein the difference of values of intake manifold pressure is classified according to a first classification based on its amount into positive one, that of zero or negative one and the difference of values of throttle opening is classified according to a second classification based on its amount into positive one, that of zero or negative one and fuzzy rules are provided respectively for areas determined by the first classification and the second classification.

3. A method for predicting intake manifold pressure according to claim 1, wherein in the step of obtaining a difference, a second order difference of values of intake manifold pressure, is further obtained and in the step of obtaining the predicted difference, fuzzy rules are determined based on an amount of the difference of values of intake manifold pressure, an amount of the difference of values of throttle opening and an amount of the second order difference of values of intake manifold pressure.

4. A method for predicting intake manifold pressure according to claim 3, wherein a second order difference of values of intake manifold pressure is classified based on its amount into positive one, that of zero or negative one and fuzzy rules are provided respectively for areas determined by three kinds of classifications based on an amount of the difference of values of intake manifold pressure, an amount of the difference of values of throttle opening and an amount of the second order difference of values of intake manifold pressure.

5. A method for predicting intake manifold pressure according to claim 1, wherein a value obtained by delaying an input throttle opening value by a time delay is used as an output throttle opening value.

6. A method for predicting intake manifold pressure according to claim 1, wherein a relationship between an input throttle opening value and a desired value of throttle opening is modeled using a time delay element and a lag system and a value estimated through the model and the desired value is used as an output throttle opening value.

7. A method for predicting intake manifold pressure according to claim 1, wherein a membership function for a consequent part of the estimating with fuzzy reasoning is a bar-shaped singleton function.

8. A method for predicting intake manifold pressure according to claim 1, further comprising the step of filtering between the step of obtaining differences and the step of obtaining the predicted difference.

9. A method for predicting intake manifold pressure according to claim 8, wherein the filtering is carried out with an adaptive filter.

10. An apparatus for predicting intake manifold pressure, said apparatus comprising:
a first device for obtaining a difference of values of intake manifold pressure;
a second device for obtaining a difference of values of throttle opening; and
a fuzzy estimator receiving as inputs the difference of values of intake manifold pressure and the difference of values of throttle opening and obtaining and outputting a predicted difference of values of intake manifold pressure by estimating with fuzzy reasoning, including fuzzy rules determined based on an amount of the difference of values of intake manifold pressure and an amount of the difference of values of throttle opening.

11. An apparatus for predicting intake manifold pressure according to claim 10, wherein in the fuzzy estimator the difference of values of intake manifold pressure is classified according to a first classification based on its amount into positive one, that of zero or negative one and the difference of values of throttle opening is classified according to a second classification based on its amount into positive one, that of zero or negative one and fuzzy rules are provided respectively for areas determined by the first classification and the second classification.

12. An apparatus for predicting intake manifold pressure according to claim 10, wherein in the fuzzy estimator a second order difference of values of intake manifold pressure is further used as another input and fuzzy rules are determined based on an amount of the difference of values of intake manifold pressure, an amount of the difference of values of throttle opening and an amount of the second order difference of values of intake manifold pressure.

13. An apparatus for predicting intake manifold pressure according to claim 12, wherein in the fuzzy estimator a second order difference of values of intake manifold pressure is classified based on its amount into positive one, that of zero or negative one and fuzzy rules are provided respectively for areas determined by three kinds of classifications based on an amount of the difference of values of intake manifold pressure, an amount of the difference of values of throttle opening and an amount of the second order difference of values of intake manifold pressure.

14. An apparatus for predicting intake manifold pressure according to claim 10, wherein the apparatus further comprises a module for delaying an input throttle opening value by a time delay, and the delayed value is used as an output throttle opening value.

15. An apparatus for predicting intake manifold pressure according to claim 10, wherein a relationship between an input throttle opening value and a desired value of throttle opening is modeled using a time delay element and a lag system and a value estimated through the model and the desired value is used as an output throttle opening value.

16. An apparatus for predicting intake manifold pressure according to claim 10, wherein a membership function for the consequent part of the estimating with fuzzy reasoning comprises a bar-shaped singleton function.

17. An apparatus for predicting intake manifold pressure according to claim 10, further comprising a filter for filtering an input.

18. An apparatus for predicting intake manifold pressure according to claim 17, wherein the filter comprises an adaptive filter.

19. A computer-readable medium having a program stored therein, the program is made to perform the steps of:
obtaining a difference of values of intake manifold pressure and a difference of values of throttle opening;
obtaining a predicted difference of values of intake manifold pressure by estimating with fuzzy reasoning, including fuzzy rules determined based on an amount of the difference of values of intake manifold pressure and an amount of the difference of values of throttle opening; and
adding the predicted difference of values of intake manifold pressure, to a value of intake manifold pressure, to obtain a predicted value of intake manifold pressure.

20. A computer-readable medium according to claim 19, wherein the difference of values of intake manifold pressure is classified according to a first classification based on its amount into positive one, that of zero or negative one and the difference of values of throttle opening is classified according to a second classification based on its amount into positive one, that of zero or negative one and fuzzy rules are provided respectively for areas determined by the first classification and the second classification.

21. A computer-readable medium according to claim 19, wherein in the step of obtaining a difference, a second order difference of values of intake manifold pressure, is further obtained and in the step of obtaining the predicted difference, fuzzy rules are determined based on an amount of the difference of values of intake manifold pressure, an amount of the difference of values of throttle opening and an amount of the second order difference of values of intake manifold pressure.

22. A computer-readable medium according to claim 21, wherein a second order difference of values of intake manifold pressure is classified based on its amount into positive one, that of zero or negative one and fuzzy rules are provided respectively for areas determined by three kinds of classifications based on an amount of the difference of values of intake manifold pressure, an amount of the difference of values of throttle opening and an amount of the second order difference of values of intake manifold pressure.

23. A computer-readable medium according to claim 19, wherein a value obtained by delaying an input throttle opening value by a time delay, is used as an output throttle opening value.

24. A computer-readable medium according to claim 19, wherein a relationship between an input throttle opening value and a desired value of throttle opening is modeled using a time delay element and a lag system and a value estimated through the model and the desired value is used as an output throttle opening value.

25. A computer-readable medium according to claim 19, wherein the membership function for the consequent part of the estimating with fuzzy reasoning comprises a bar-shaped singleton function.

26. A computer-readable medium according to claim 19, wherein the program further comprises the step of filtering between the step of obtaining differences and the step of obtaining a predicted difference.

27. A computer-readable medium according to claim 26, wherein the filtering is carried out with an adaptive filter.

28. An apparatus for predicting intake manifold pressure, said apparatus comprising:
means for obtaining a difference of values of intake manifold pressure;
means for obtaining a difference of values of throttle opening; and
fuzzy estimator means for receiving as inputs the difference of values of intake manifold pressure and the difference of values of throttle opening and obtaining and outputting a predicted difference of values of intake manifold pressure by estimating with fuzzy reasoning, including fuzzy rules determined based on an amount of the difference of values of intake manifold pressure and an amount of the difference of values of throttle opening.

29. An apparatus for predicting intake manifold pressure according to claim 28, wherein in the fuzzy estimator means the difference of values of intake manifold pressure is classified according to a first classification based on its amount into positive one, that of zero or negative one and the difference of values of throttle opening is classified according to a second classification based on its amount into positive one, that of zero or negative one and fuzzy rules are provided respectively for areas determined by the first classification and the second classification.

30. An apparatus for predicting intake manifold pressure according to claim 28, wherein in the fuzzy estimator means a second order difference of values of intake manifold pressure is further used as another input and fuzzy rules are determined based on an amount of the difference of values of intake manifold pressure, an amount of the difference of values of throttle opening and an amount of the second order difference of values of intake manifold pressure.

31. An apparatus for predicting intake manifold pressure according to claim 30, wherein in the fuzzy estimator means a second order difference of values of intake manifold pressure is classified based on its amount into positive one, that of zero or negative one and fuzzy rules are provided respectively for areas determined by three kinds of classifications based on an amount of the difference of values of intake manifold pressure, an amount of the difference of values of throttle opening and an amount of the second order difference of values of intake manifold pressure.

32. An apparatus for predicting intake manifold pressure according to claim 28, wherein the apparatus further comprises module means for delaying an input throttle opening value by a time delay, and the delayed value is used as an output throttle opening value.

33. An apparatus for predicting intake manifold pressure according to claim 28, wherein a relationship between an input throttle opening value and a desired value of throttle opening is modeled using a time delay element and a lag system and a value estimated through the model and the desired value is used as an output throttle opening value.

34. An apparatus for predicting intake manifold pressure according to claim 28, wherein the membership function for the consequent part of the estimating with fuzzy reasoning comprises a bar-shaped singleton function.

35. An apparatus for predicting intake manifold pressure according to claim 28, further comprising filter means for filtering an input.

36. An apparatus for predicting intake manifold pressure according to claim 35, wherein the filter means comprises an adaptive filter.

* * * * *